(12) United States Patent
Suciu et al.

(10) Patent No.: US 10,329,946 B2
(45) Date of Patent: Jun. 25, 2019

(54) SLIDING GEAR ACTUATION FOR VARIABLE VANES

(71) Applicant: UNITED TECHNOLOGIES CORPORATION, Farmington, CT (US)

(72) Inventors: Gabriel L Suciu, Glastonbury, CT (US); Jesse M Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 534 days.

(21) Appl. No.: 15/079,454

(22) Filed: Mar. 24, 2016

(65) Prior Publication Data

US 2017/0276015 A1 Sep. 28, 2017

(51) Int. Cl.
| | | |
|---|---|---|
| *F01D 17/16* | (2006.01) | |
| *F02K 3/06* | (2006.01) | |
| *F01D 9/04* | (2006.01) | |
| *F01D 17/12* | (2006.01) | |
| *F01D 25/34* | (2006.01) | |

(52) U.S. Cl.
CPC ............ *F01D 17/162* (2013.01); *F01D 9/04* (2013.01); *F01D 9/042* (2013.01); *F01D 17/12* (2013.01); *F01D 25/34* (2013.01); *F02K 3/06* (2013.01); *F05D 2220/323* (2013.01); *F05D 2240/10* (2013.01); *F05D 2240/12* (2013.01); *F05D 2260/40* (2013.01)

(58) Field of Classification Search
CPC ........ F01D 17/12; F01D 17/14; F01D 17/162; F01D 25/34; F01D 9/04; F01D 9/02; F04D 29/323; F04D 29/362; F04D 29/563; F04D 29/582; F04D 29/542; F02C 9/20; F02C 9/2236
See application file for complete search history.

(56) References Cited

U.S. PATENT DOCUMENTS

| | | | |
|---|---|---|---|
| 2,435,091 A | 1/1948 | Meyer | |
| 2,862,687 A | 12/1958 | Aguet et al. | |
| 2,923,459 A | 2/1960 | Taylor | |
| 3,025,036 A * | 3/1962 | Kumm | F01D 17/162 415/146 |
| 3,227,176 A | 1/1966 | Luebering et al. | |

(Continued)

FOREIGN PATENT DOCUMENTS

| | | |
|---|---|---|
| CH | 319364 A | 2/1957 |
| DE | 2448572 A1 | 4/1976 |

(Continued)

OTHER PUBLICATIONS

Office action dated Jun. 13, 2018 for U.S. Appl. No. 15/079,432.

(Continued)

*Primary Examiner* — Justin D Seabe
*Assistant Examiner* — Behnoush Haghighian
(74) *Attorney, Agent, or Firm* — Bachman & LaPointe, P.C.

(57) ABSTRACT

A variable vane system for a gas turbine engine includes a geared unison ring driven by a drive gear, the geared unison ring axially slidable parallel to an engine axis with respect to the drive gear as the rotation of the unison ring results in axial motion that is accommodated by the axial sliding between a gear mesh of the geared unison ring and the drive gear.

12 Claims, 33 Drawing Sheets

(56) References Cited

U.S. PATENT DOCUMENTS

| | | | |
|---|---|---|---|
| 3,458,118 | A | 7/1969 | Burge et al. |
| 3,632,224 | A * | 1/1972 | Wright .................. F01D 17/162 |
| | | | 415/147 |
| 3,779,665 | A | 12/1973 | Tatem, Jr. et al. |
| 3,873,230 | A | 3/1975 | Norris et al. |
| 3,876,334 | A | 4/1975 | Andrews |
| 3,893,784 | A | 7/1975 | Zerlauth |
| 3,914,066 | A | 10/1975 | Downing |
| 3,964,839 | A | 6/1976 | Kusiak |
| 4,275,560 | A | 6/1981 | Wright et al. |
| 4,403,912 | A | 9/1983 | Pekari et al. |
| 4,619,580 | A | 10/1986 | Snyder |
| 4,720,237 | A | 1/1988 | Weiner et al. |
| 4,750,862 | A | 6/1988 | Barnes et al. |
| 4,968,217 | A | 11/1990 | Newton |
| 5,096,374 | A | 3/1992 | Sakai et al. |
| 5,190,439 | A | 3/1993 | Das |
| 5,549,448 | A | 8/1996 | Langston |
| 5,595,474 | A * | 1/1997 | Girard ..................... B64C 11/44 |
| | | | 416/1 |
| 5,620,301 | A | 4/1997 | Lawer |
| 5,630,701 | A | 5/1997 | Lawer |
| 5,993,152 | A | 11/1999 | Schilling |
| 6,398,483 | B1 | 6/2002 | Conete et al. |
| 6,769,868 | B2 | 8/2004 | Harrold |
| 6,821,084 | B2 | 11/2004 | Bathori et al. |
| 7,112,041 | B2 | 9/2006 | Debeneix et al. |
| 7,322,790 | B2 | 1/2008 | Bouru |
| 7,506,514 | B2 | 3/2009 | Muldoon et al. |
| 7,527,130 | B2 | 5/2009 | Baudendistal |
| 7,578,131 | B2 | 8/2009 | Muldoon et al. |
| 7,588,415 | B2 | 9/2009 | Giaimo et al. |
| 7,628,579 | B2 | 12/2009 | Giaimo et al. |
| 7,647,775 | B2 | 1/2010 | Muldoon et al. |
| 7,665,959 | B2 | 2/2010 | Giaimo et al. |
| 7,690,889 | B2 | 4/2010 | Giaimo et al. |
| 7,713,022 | B2 | 5/2010 | Major et al. |
| 7,722,318 | B2 | 5/2010 | Addis |
| 7,753,647 | B2 | 7/2010 | Giaimo et al. |
| 7,806,652 | B2 | 10/2010 | Major et al. |
| 7,854,112 | B2 | 12/2010 | Roberge |
| 7,871,242 | B2 | 1/2011 | Swanson et al. |
| 7,901,178 | B2 | 3/2011 | Giaimo et al. |
| 7,901,185 | B2 * | 3/2011 | Suciu ..................... F01D 5/148 |
| | | | 416/155 |
| 7,927,067 | B2 | 4/2011 | Rajamani et al. |
| 8,007,229 | B2 | 8/2011 | McCaffrey et al. |
| 8,052,388 | B2 | 11/2011 | McCaffrey et al. |
| 8,061,119 | B2 | 11/2011 | Agrawal et al. |
| 8,074,498 | B2 | 12/2011 | Agrawal et al. |
| 8,090,456 | B2 | 1/2012 | Karpman et al. |
| 8,092,157 | B2 | 1/2012 | McCaffrey |
| 8,123,228 | B2 | 2/2012 | Muldoon et al. |
| 8,123,472 | B2 | 2/2012 | Redgwell |
| 8,131,384 | B2 | 3/2012 | Karpman et al. |
| 8,195,311 | B2 | 6/2012 | Karpman et al. |
| 8,202,043 | B2 | 6/2012 | McCaffrey |
| 8,204,671 | B2 | 6/2012 | Agrawal et al. |
| 8,210,800 | B2 | 7/2012 | Suciu et al. |
| 8,215,902 | B2 | 7/2012 | Major et al. |
| 8,240,983 | B2 | 8/2012 | Suljak, Jr. et al. |
| 8,315,741 | B2 | 11/2012 | Karpman et al. |
| 8,328,512 | B2 | 12/2012 | Major et al. |
| 8,376,693 | B2 | 2/2013 | Gilman et al. |
| 8,393,857 | B2 | 3/2013 | Copeland |
| 8,459,614 | B2 | 6/2013 | Tjader |
| 8,500,394 | B2 | 8/2013 | Major et al. |
| 8,511,058 | B2 | 8/2013 | Agrawal et al. |
| 8,615,980 | B2 | 12/2013 | Agrawal et al. |
| 8,668,434 | B2 | 3/2014 | Karpman et al. |
| 8,668,444 | B2 | 3/2014 | Jarrett, Jr. et al. |
| 8,686,251 | B1 | 4/2014 | Cunnyngham |
| 8,720,258 | B2 | 5/2014 | Meisner et al. |
| 8,783,119 | B2 | 7/2014 | Little |
| 8,784,043 | B2 | 7/2014 | Bouru et al. |
| 8,915,700 | B2 | 12/2014 | Kupratis et al. |
| 8,915,703 | B2 | 12/2014 | Mohammed et al. |
| 8,943,796 | B2 | 2/2015 | McCaffrey |
| 8,951,010 | B2 | 2/2015 | Major et al. |
| 8,961,125 | B2 | 2/2015 | Chuong et al. |
| 9,003,808 | B2 | 4/2015 | Kupratis |
| 9,038,366 | B2 | 5/2015 | Merry et al. |
| 9,062,560 | B2 | 6/2015 | Hayford et al. |
| 9,091,209 | B2 | 7/2015 | LeBlanc et al. |
| 9,097,137 | B2 | 8/2015 | Suciu et al. |
| 9,103,227 | B2 | 8/2015 | Kupratis et al. |
| 9,151,178 | B2 | 10/2015 | Holchin et al. |
| 9,157,366 | B2 | 10/2015 | Kupratis |
| 9,194,329 | B2 | 11/2015 | Merry et al. |
| 9,228,438 | B2 | 1/2016 | Dube et al. |
| 9,243,648 | B2 | 1/2016 | Clemons et al. |
| 9,470,153 | B2 | 10/2016 | Suciu et al. |
| 9,534,501 | B2 | 1/2017 | Hung et al. |
| 9,617,922 | B2 | 4/2017 | Emmons |
| 2005/0153812 | A1 | 7/2005 | Box et al. |
| 2008/0273976 | A1 | 11/2008 | Suciu et al. |
| 2010/0172745 | A1 | 7/2010 | Hodder |
| 2012/0121403 | A1 | 5/2012 | Clemons et al. |
| 2012/0128481 | A1 | 5/2012 | Baumas et al. |
| 2014/0064912 | A1 * | 3/2014 | Velampati ............. F01D 17/162 |
| | | | 415/1 |
| 2014/0155219 | A1 | 6/2014 | McCune et al. |
| 2014/0169948 | A1 | 6/2014 | Kay et al. |
| 2014/0314549 | A1 | 10/2014 | Pakkala et al. |
| 2015/0052908 | A1 | 2/2015 | Todorovic |
| 2015/0075310 | A1 | 3/2015 | Lunin et al. |
| 2015/0101331 | A1 | 4/2015 | Goulds |
| 2015/0167481 | A1 | 6/2015 | Hung et al. |
| 2015/0275770 | A1 | 10/2015 | Emmons |
| 2015/0362056 | A1 | 12/2015 | Tsai et al. |
| 2016/0024959 | A1 | 1/2016 | Do et al. |
| 2017/0044991 | A1 | 2/2017 | Suciu et al. |
| 2017/0248156 | A1 | 8/2017 | Parker |
| 2017/0276011 | A1 | 9/2017 | Chandler et al. |
| 2017/0276012 | A1 | 9/2017 | Chandler et al. |
| 2017/0276013 | A1 | 9/2017 | Suciu et al. |
| 2017/0276014 | A1 | 9/2017 | Chandler et al. |
| 2017/0276016 | A1 | 9/2017 | Suciu et al. |
| 2017/0276017 | A1 | 9/2017 | Suciu et al. |
| 2017/0276018 | A1 | 9/2017 | Bifulco et al. |
| 2017/0276146 | A1 | 9/2017 | Suciu et al. |
| 2017/0276147 | A1 | 9/2017 | Suciu et al. |
| 2017/0276148 | A1 | 9/2017 | Suciu et al. |
| 2018/0100407 | A1 | 4/2018 | Leopold |
| 2018/0119566 | A1 | 5/2018 | Leopold |

FOREIGN PATENT DOCUMENTS

| | | | |
|---|---|---|---|
| EP | 0909880 | A2 | 4/1999 |
| EP | 1961919 | A2 | 8/2008 |
| EP | 2107217 | A1 | 10/2009 |
| EP | 2211026 | A2 | 7/2010 |
| FR | 995131 | A | 11/1951 |
| GB | 757577 | A | 9/1956 |
| GB | 1466613 | A * | 3/1977 ........... F01D 17/162 |
| GB | 2197912 | A | 6/1988 |
| GB | 2301868 | A | 12/1996 |
| JP | 57049759 | B | 10/1982 |
| WO | 2008124758 | A1 | 10/2008 |
| WO | 2013192055 | A1 | 12/2013 |
| WO | 2014189568 | A2 | 11/2014 |
| WO | 2015122934 | A1 | 8/2015 |

OTHER PUBLICATIONS

Office action dated Jun. 14, 2018 for U.S. Appl. No. 15/079,505.
Ueura, Keiji; Development of the Harmonic Drive for Space Applications; European Space Mechanisms and Tribology Symposium, 1999, from http://esmats.eu/esmatspapers/completelist.pjp?which year=1999.
Office action dated May 14, 2018 for U.S. Appl. No. 15/079,400.
Office action dated May 30, 2018 for U.S. Appl. No. 15/079,446.
Office action dated May 10, 2018 for U.S. Appl. No. 15/079,409.

(56) References Cited

OTHER PUBLICATIONS

U.S. Office Action dated Nov. 17, 2017, in corresponding U.S. Appl. No. 15/079,417.
European Search Report dated Sep. 4, 2017 for European Patent Application No. 17162820.9.
European Search Report dated Sep. 1, 2017 for European Patent Application No. 17162813.4.
European Search Report dated Aug. 30, 2017 for European Patent Application No. 17162774.8.
European Search Report dated Sep. 7, 2017 for European Patent Application No. 17162825.8.
European Search Report dated Sep. 5, 2017 for European Patent Application No. 17162817.5.
European Search Report dated Aug. 28, 2017 for European Patent Application No. 17162778.9.
European Search Report dated Jul. 25, 2017 for European Patent Application No. 17162762.3.
Anonymous, "Harmonic drive", Feb. 11, 2013, XP055402841.
European Search Report dated Sep. 25, 2017 for European Patent Application No. 17162867.0.
European Search Report dated Sep. 27, 2017 for European Patent Application No. 17162883.7.
European Search Report dated Oct. 5, 2017 for European Patent Application No. 17162913.2.
European Search Report dated Sep. 26, 2017 for European Patent Application No. 17162874.6.
Office action dated Oct. 22, 2018 for U.S. Appl. No. 15/079,400.
Office action dated Oct. 16, 2018 for U.S. Appl. No. 15/079,392.
Office action dated Jul. 25, 2018 for U.S. Appl. No. 15/079,469.
Office action dated Aug. 8, 2018 for U.S. Appl. No. 15/079,482.
Office action dated Sep. 19, 2018 for U.S. Appl. No. 15/079,382.

\* cited by examiner

SLIDING GEAR ACTUATION FOR VARIABLE VANES

BACKGROUND

The present disclosure relates to a gas turbine engine and, more particularly, to a variable vane system therefor.

Gas turbine engines, such as those that power modern commercial and military aircraft, generally include a compressor section to pressurize airflow, a combustor section to burn a hydrocarbon fuel in the presence of the pressurized air, and a turbine section to extract energy from the resultant combustion gases.

Some gas turbine engines include variable vanes that can be pivoted about their individual axes to change an operational performance characteristic. Typically, the variable vanes are robustly designed to handle the stress loads that are applied to change the position of the vanes. A mechanical linkage is typically utilized to rotate the variable vanes. Because forces on the variable vanes can be relatively significant, forces transmitted through the mechanical linkage can also be relatively significant. Legacy compressor designs typically utilize fueldraulic actuation to rotate the variable vanes.

SUMMARY

A variable vane system according to one disclosed non-limiting embodiment of the present disclosure can include an actuator; a harmonic drive driven by the actuator; a drive gear driven by the harmonic drive; and a geared unison ring driven by the drive gear, the geared unison ring axially slidable with respect to the drive gear.

A further embodiment of the present disclosure may include wherein the geared unison ring includes a gear segment meshed with the drive gear.

A further embodiment of the present disclosure may include wherein the drive gear is wider than the gear segment.

A further embodiment of the present disclosure may include a support that rotationally supports drive gear.

A further embodiment of the present disclosure may include wherein the harmonic drive includes a strain wave gearing mechanism.

A further embodiment of the present disclosure may include wherein the strain wave gearing mechanism include a fixed circular spline, a flex spline attached to an output shaft, and a wave generator attached to an input shaft, the flex spline driven by the wave generator with respect to the circular spline.

A further embodiment of the present disclosure may include wherein the first actuator gear includes a drive arm.

A further embodiment of the present disclosure may include wherein the drive arm is connected to a first unison ring.

A further embodiment of the present disclosure may include a link between each of a multiple of variable vanes and the first unison ring.

A further embodiment of the present disclosure may include wherein the second actuator gear includes a second drive arm.

A further embodiment of the present disclosure may include wherein the second drive arm is connected to a second unison ring.

A further embodiment of the present disclosure may include wherein the harmonic drive provides between a 30:1-320:1 gear ratio.

A further embodiment of the present disclosure may include wherein the first gear segment and the second gear segment are each less than 180 degrees.

A further embodiment of the present disclosure may include wherein the multi-planar drive gear is operable to rotate through about 90 degrees.

A further embodiment of the present disclosure may include wherein the actuator is an electric motor.

A gas turbine engine according to one disclosed non-limiting embodiment of the present disclosure can include a harmonic drive operable to drive a variable vane system through a geared connection, the geared connection including a multi-planar drive gear driven by the harmonic drive.

A further embodiment of the present disclosure may include wherein the multi-planar drive gear includes a first set of gear teeth in a first plane and a second set of gear teeth in a second plane.

A further embodiment of the present disclosure may include, wherein the geared connection includes at least one idler gear.

A further embodiment of the present disclosure may include wherein the at least one idler gear is rotationally mounted to a case of the gas turbine engine.

A further embodiment of the present disclosure may include wherein the geared connection includes at least one drive gear directly mounted to a variable vane.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
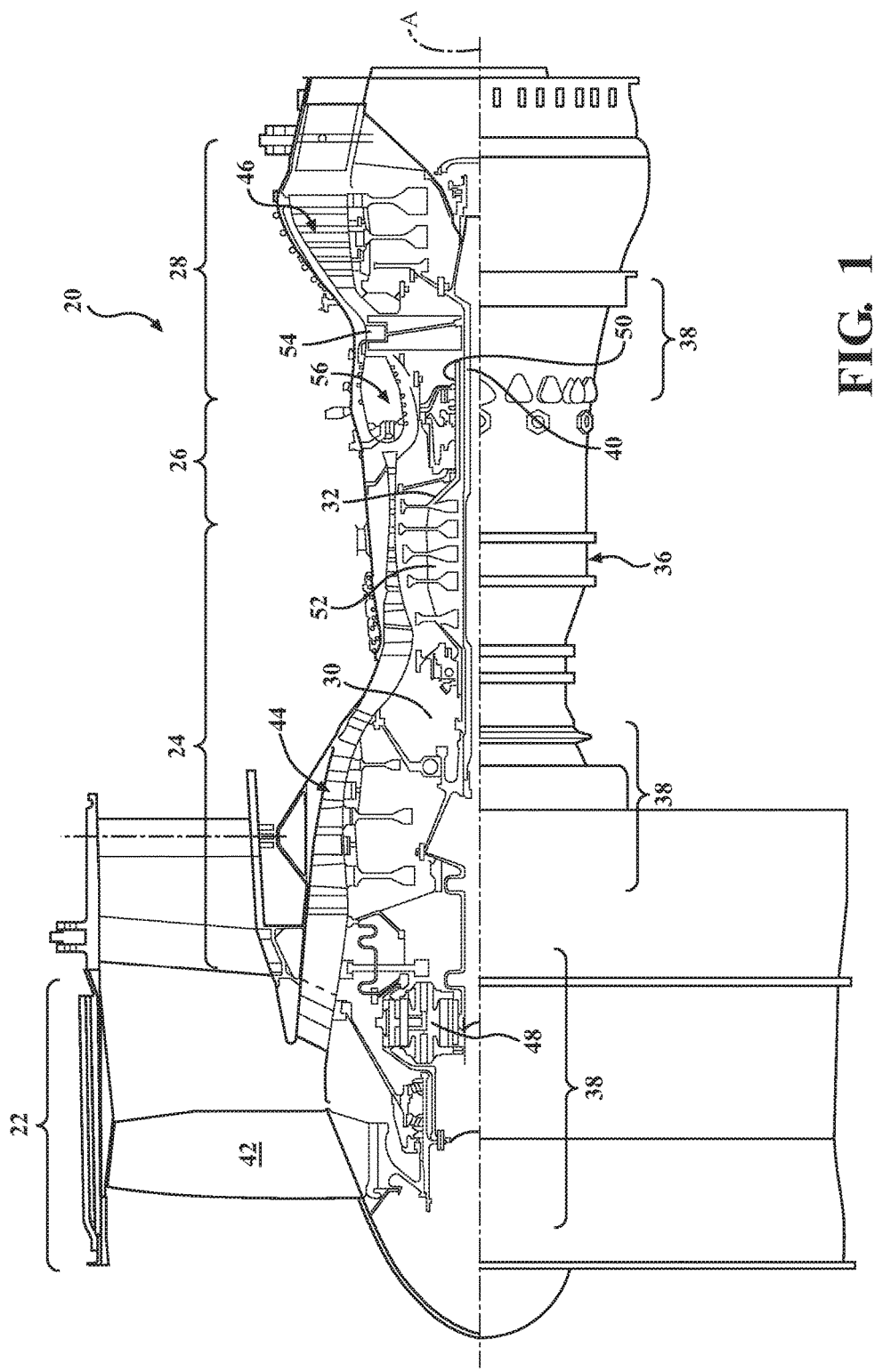
FIG. 1 is a schematic cross-section of an example gas turbine engine architecture.

FIG. 1 schematically illustrates a gas turbine engine 20. The gas turbine engine 20 is disclosed herein as a two-spool GTF (geared turbofan) that generally incorporates a fan section 22, a compressor section 24, a combustor section 26 and a turbine section 28. Alternative engine architectures might include an augmenter section and exhaust duct section (not shown) among other systems or features. The fan section 22 drives air along a bypass flowpath while the compressor section 24 drives air along a core flowpath for compression and communication into the combustor section 26 then expansion thru the turbine section 28. Although depicted as a GTF in the disclosed non-limiting embodiment, it should be understood that the concepts described herein are not limited to use with GTF as the teachings may be applied to other types of turbine engines such as a Direct-Drive-Turbofan with high, or low bypass augmented turbofan, turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing compartments 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or thru a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by the bearing compartments 38. It should be understood that various bearing compartments 38 at various locations may alternatively or additionally be provided.

In one example, the gas turbine engine 20 is a high-bypass geared aircraft engine with a bypass ratio greater than about six (6:1). The geared architecture 48 can include an epicyclic gear train, such as a planetary gear system or other gear system. The example epicyclic gear train has a gear reduction ratio of greater than about 2.3:1, and in another example is greater than about 3.0:1. The geared turbofan enables operation of the low spool 30 at higher speeds which can increase the operational efficiency of the LPC 44 and LPT 46 to render increased pressure in a relatively few number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans, where the rotational speed of the fan 42 is the same (1:1) of the LPC 44.

In one example, a significant amount of thrust is provided by the bypass flow path due to the high bypass ratio. The fan section 22 of the gas turbine engine 20 is designed for a particular flight condition—typically cruise at about 0.8 Mach and about 35,000 feet (10668 meters). This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The relatively low Fan Pressure Ratio according to one example gas turbine engine 20 is less than 1.45. Low Corrected Fan Tip Speed is the actual fan tip speed divided by an industry standard temperature correction of ("T"/518.7)$^{0.5}$ in which "T" represents the ambient temperature in degrees Rankine. The Low Corrected Fan Tip Speed according to one example gas turbine engine 20 is less than about 1150 fps (351 m/s).

Figure 2:
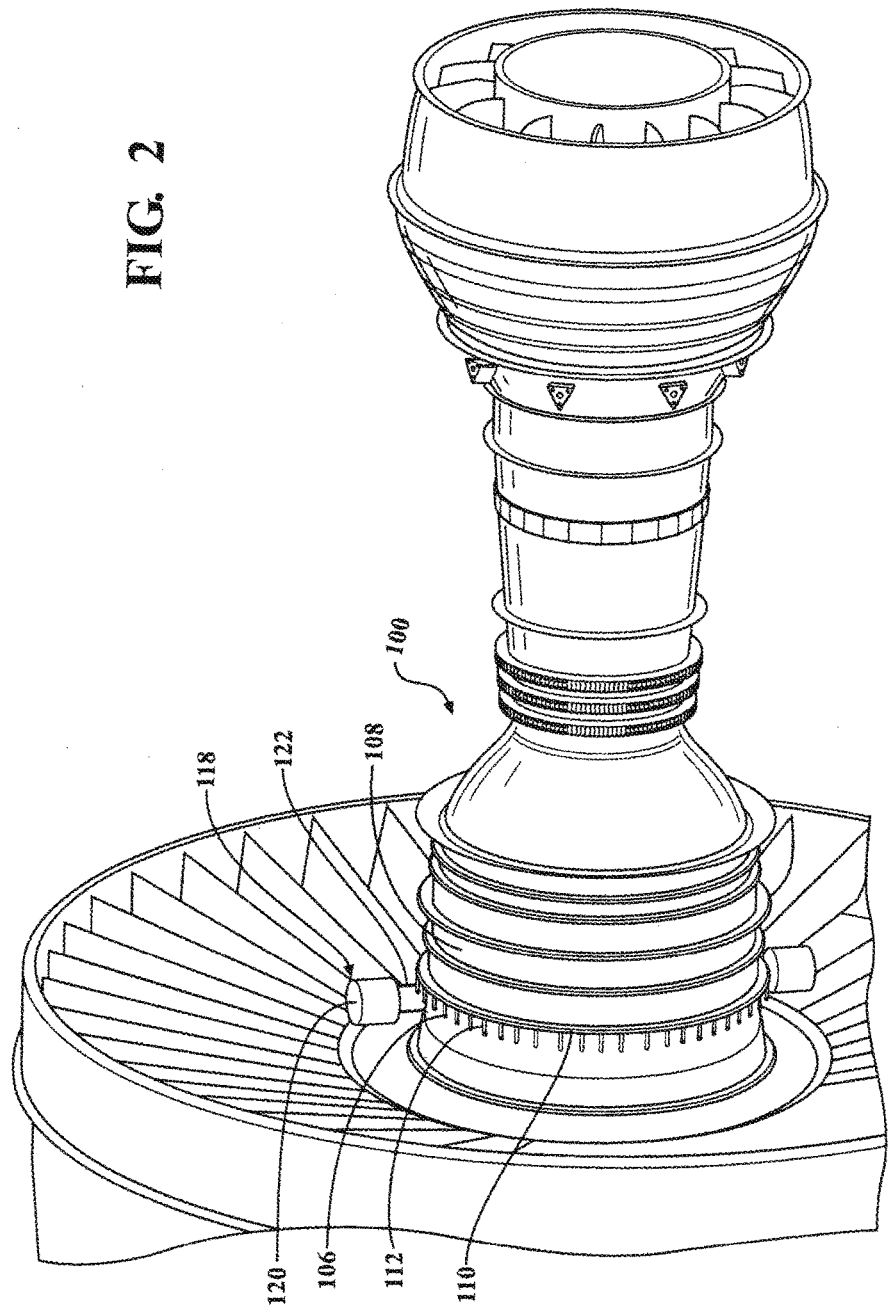
FIG. 2 is a perspective view of a variable vane system for a gas turbine engine.

With reference to FIG. 2, one or more stages of the LPC 44 and/or the HPC 52 include a variable vane system 100 that can be rotated to change an operational performance characteristic of the gas turbine engine 20 for different operating conditions. The variable vane system 100 may include one or more variable vane stages.

The variable vane system 100 may include a plurality of variable vanes 102 circumferentially arranged around the engine central axis A. The variable vanes 102 each include a variable vane body that has an airfoil portion that provides a lift force via Bernoulli's principle such that one side of the airfoil portion generally operates as a suction side and the opposing side of the airfoil portion generally operates as a pressure side. Each of the variable vanes 102 generally spans between an inner diameter and an outer diameter relative to the engine central axis A.

Figure 3:
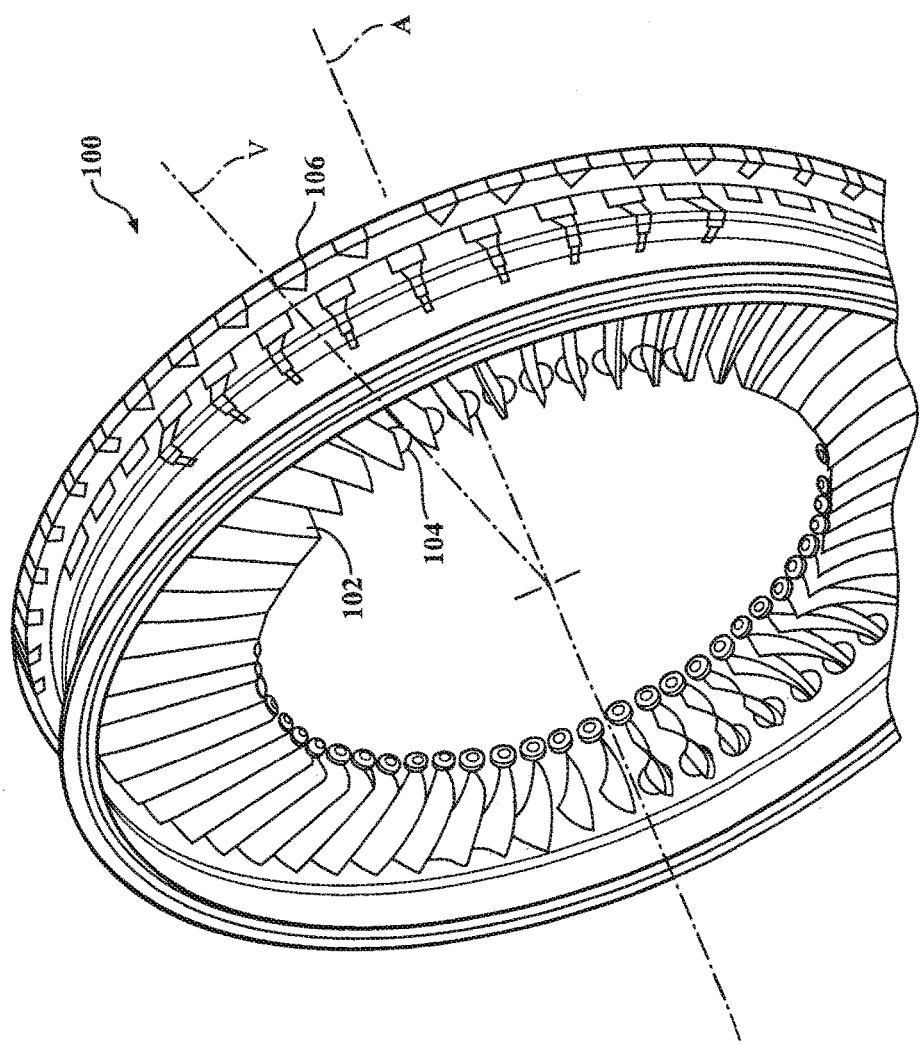
FIG. 3 is a partial perspective view of one stage of a variable vane system for a gas turbine engine.

With reference to FIG. 3, each of the variable vanes 102 includes an inner pivot pin 104 that is receivable into a corresponding socket (not shown) and an outer trunion 106 mounted through an outer case 108 such that each of the variable vanes 102 can pivot about a vane axis V. The outer trunion 106 is defined along the vane axis V (FIG. 3).

Figure 4:
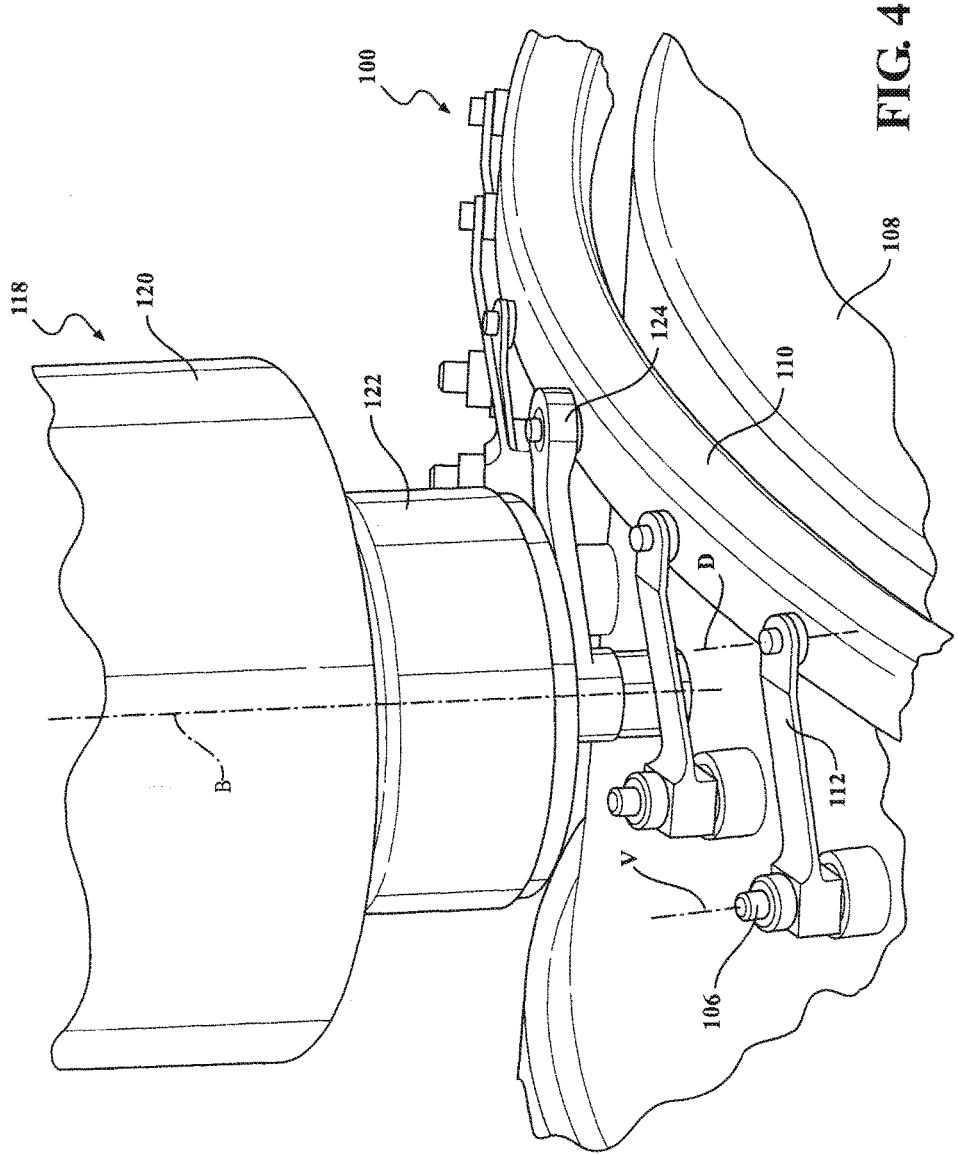
FIG. 4 is a schematic view of a variable vane system for a gas turbine engine according to one disclosed non-limiting embodiment.

With reference to FIG. 4, the variable vane system 100 further includes a unison ring 110 to which, in one disclosed non-limiting embodiment, each of the outer trunions 106 are attached through a drive arm 112 along a respective axis D. It should be appreciated that although a particular drive arm 112 is disclosed in this embodiment, various linkages of various geometries may be utilized.

Figure 5:
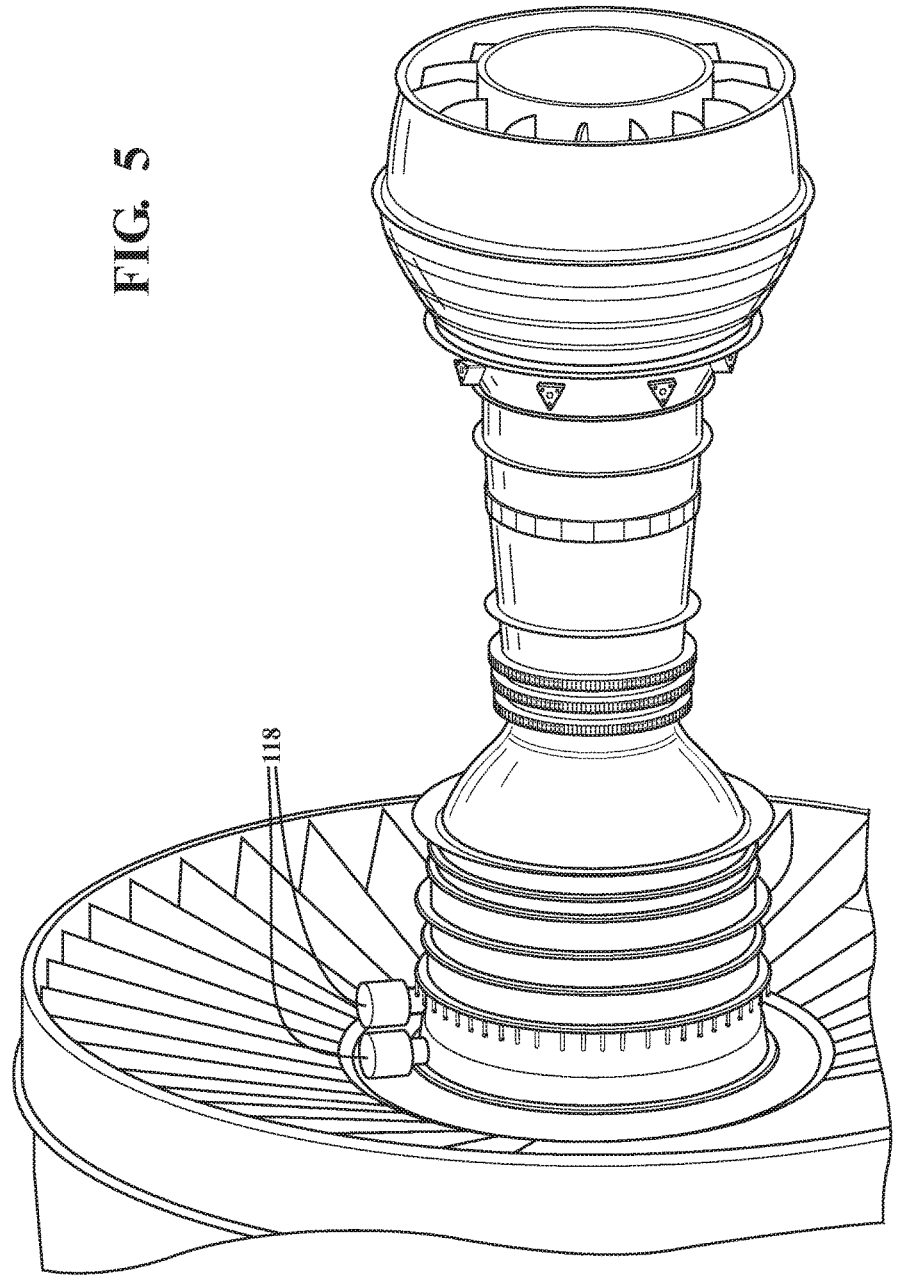
FIG. 5 is a perspective view of a variable vane system for a gas turbine engine.

The variable vane system 100 is driven by an actuator system 118 with an actuator 120, a harmonic drive 122 and an actuator arm 124. Although particular components are separately described, it should be appreciated that alternative or additional components may be provided. Although a single actuator system 118 may be utilized for each stage (FIG. 5), multiple actuator systems 118 may be provided on a single stage (FIG. 5) to facilitate additional stability for each singe unison ring 110.

The actuator 120 may include an electric motor or other electric powered device. The actuator 120 is defined along an axis B.

Figure 6:
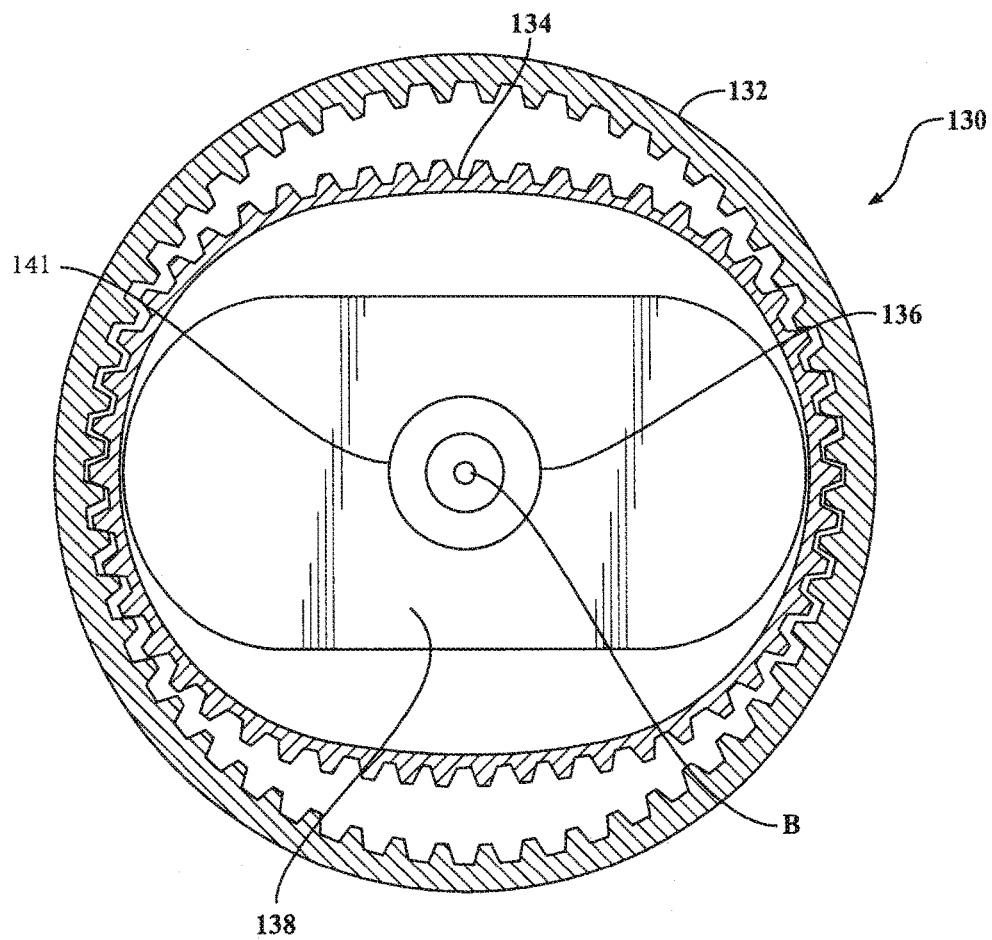
FIG. 6 is a schematic view of harmonic drive system.

The harmonic drive 122 includes a strain wave gearing mechanism 130 that, in one example, may provide a 30:1-320:1 gear ratio in a compact package that significantly reduces the rotation and increases the torque provided by the actuator 120. The strain wave gearing mechanism 130 generally includes a fixed circular spline 132, a flex spline 134 attached to an output shaft 136 along an axis B, and a wave generator 138 attached to an input shaft 141 which is connected to the actuator 120 along axis B (FIG. 6).

The harmonic drive 122 essentially provides no backlash, compactness and light weight, high gear ratios, reconfigurable ratios within a standard housing, good resolution and excellent repeatability when repositioning inertial loads, high torque capability, and coaxial input and output shafts. The harmonic drive 122 thereby prevents back driving by the relatively high aerodynamic forces experienced by the variable vanes 102.

The harmonic drive 122 need only rotate the drive arm 124 through about 90 degrees and, in a more specific embodiment, only about 0-40 degrees to drive rotation of the unison ring 110, thence the individual variable vanes 102 through the respective drive arms 112. That is, the actuator arm 124 rotates the unison ring 110 that, in turn, rotates the drive arms 112 along their respective axis B to rotate the trunions 106, and thus the variable vanes 102 about axis V.

Figure 7:
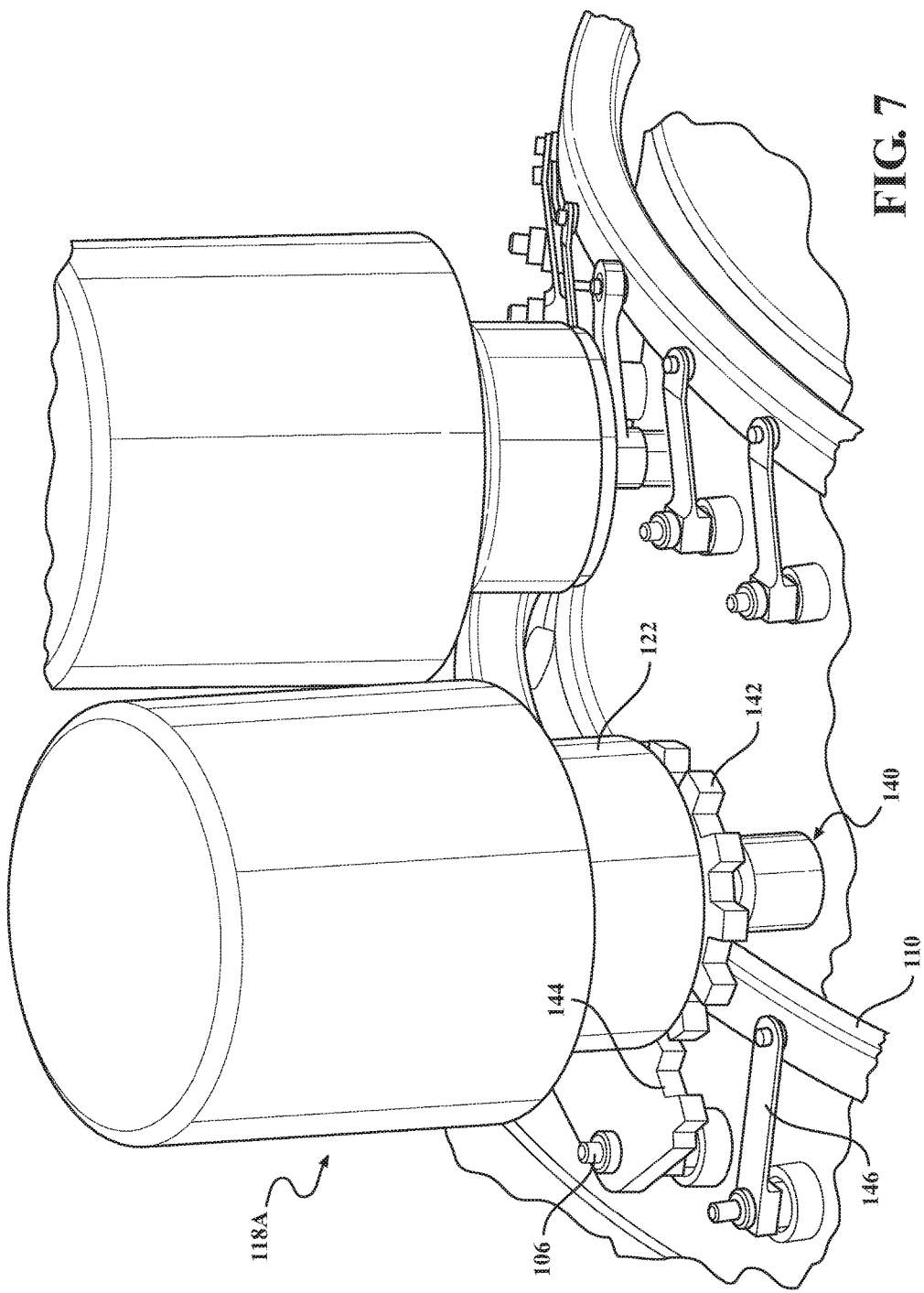
FIG. 7 is an expanded perspective view of a variable vane system for a gas turbine engine according to one disclosed non-limiting embodiment.

With reference to FIG. 7, in another disclosed embodiment, the actuator system 118A includes a geared connection 140 between the harmonic drive 122 and a drive gear 142 that is meshed with an actuator gear 144 mounted to a trunion 106 of a variable vane 102. The actuator gear 144 may be a gear segment of about ninety degrees.

Figure 8:
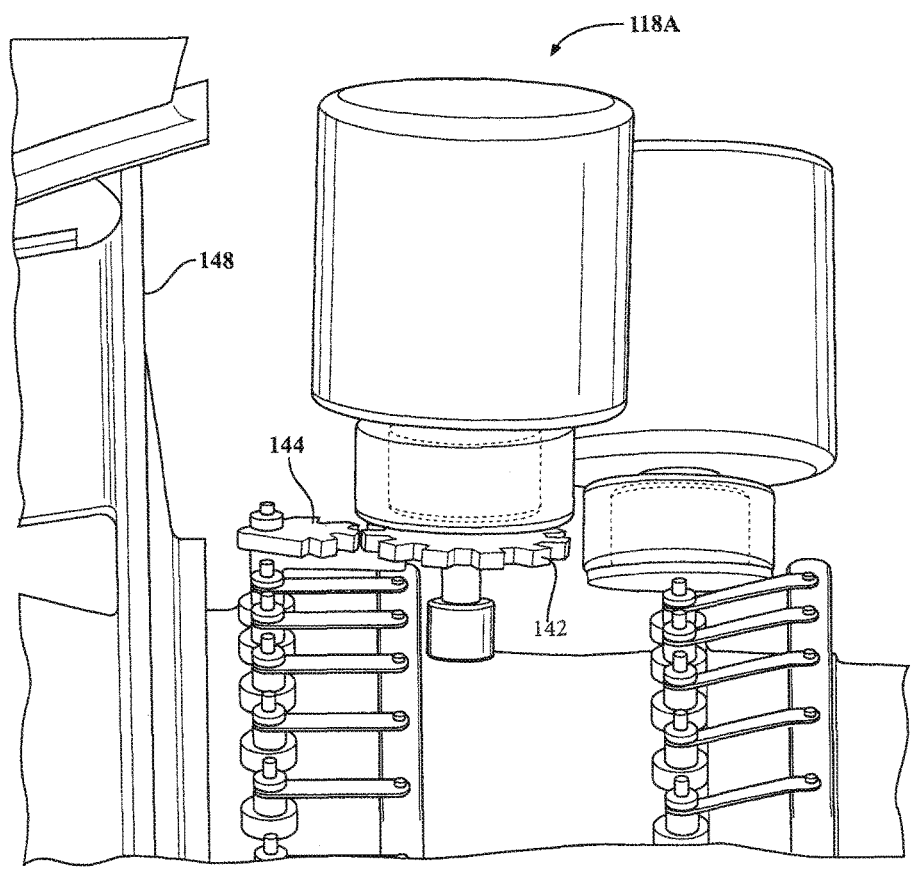
FIG. 8 is a side view of the variable vane system of FIG. 7.

The other variable vanes 102 are attached to the unison ring 110 though respective links 146. The geared connection 140 provides for an offset to accommodate insufficient space for a direct connection attached concentric to the axis of a variable vane, such as the first LPC variable vane stage that is typically adjacent to a structural wall 148 such as a firewall (FIG. 8).

Figure 10:
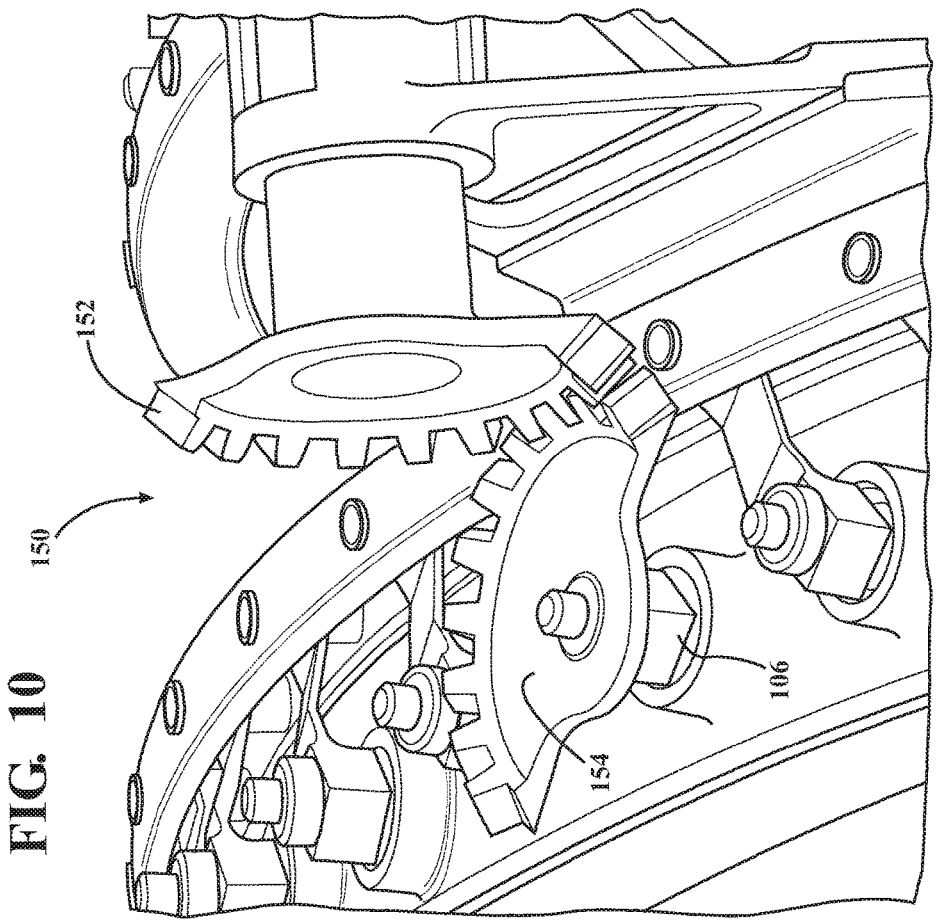
FIG. 10 is an expanded perspective view of the variable vane system of FIG. 9.
Figure 9:
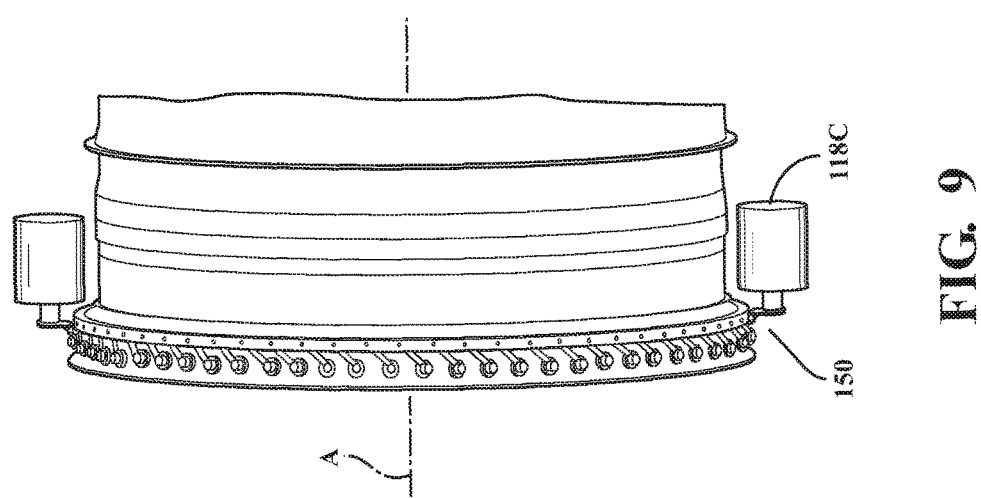
FIG. 9 is a side view of a variable vane system for a gas turbine engine according to one disclosed non-limiting embodiment.

With reference to FIG. 9, in another disclosed embodiment, the actuator system 118C includes an axial geared connection 150 such that the actuator system 118C is generally axial with the engine axis A for installations with limited vertical packaging space. In this embodiment, the geared connection 150 includes a drive gear 152 that is meshed with an actuator gear 154 mounted to a trunion 106 in a generally perpendicular arrangement (FIG. 10). Alternatively, the geared connection 150 can be angled relative to the vane actuator via a bevel gear.

Figure 11A:
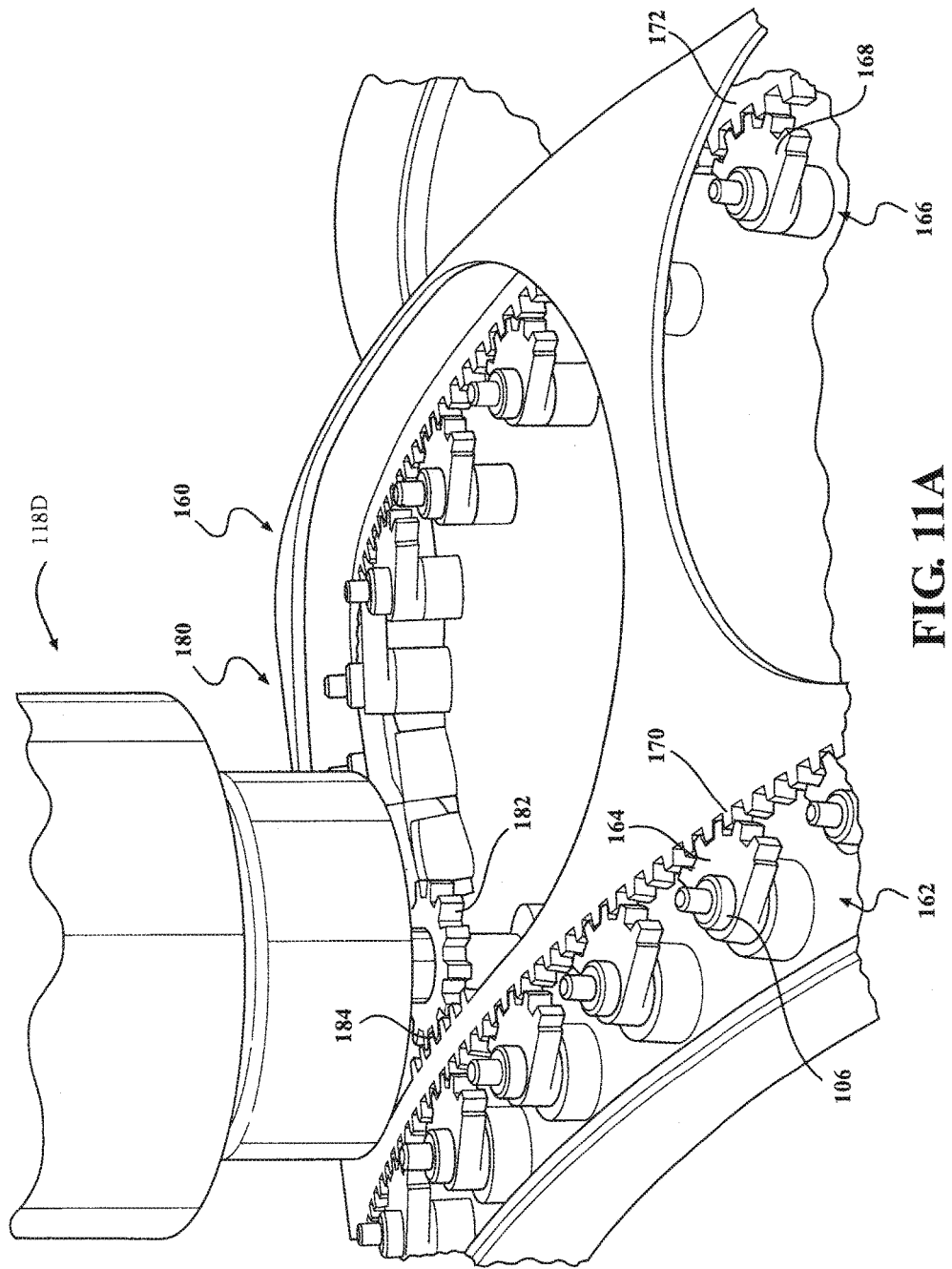
FIG. 11A is a perspective view of a variable vane system for a gas turbine engine according to one disclosed non-limiting embodiment.

With reference to FIG. 11A, in another disclosed embodiment, the actuator system 118D includes an extended geared unison ring 160 that spans at least a first variable vane stage 162 with a vane gear 164 for each first stage variable vane trunion 106 and a second variable vane stage 166 with a vane gear 168 for each second stage variable vane trunion 106. The extended geared unison ring 160 includes an associated first gear rack 170 and a second gear rack 172 that interface with the respective vane gears 164, 168. This minimizes or eliminates axial motion of the extended geared unison ring 160. In this embodiment, the geared connection 180 includes a drive gear 182 that is meshed with an actuator gear 184 on the extended geared unison ring 160. The actuator gear 184 need be only a relatively short gear rack segment.

Figure 11B:
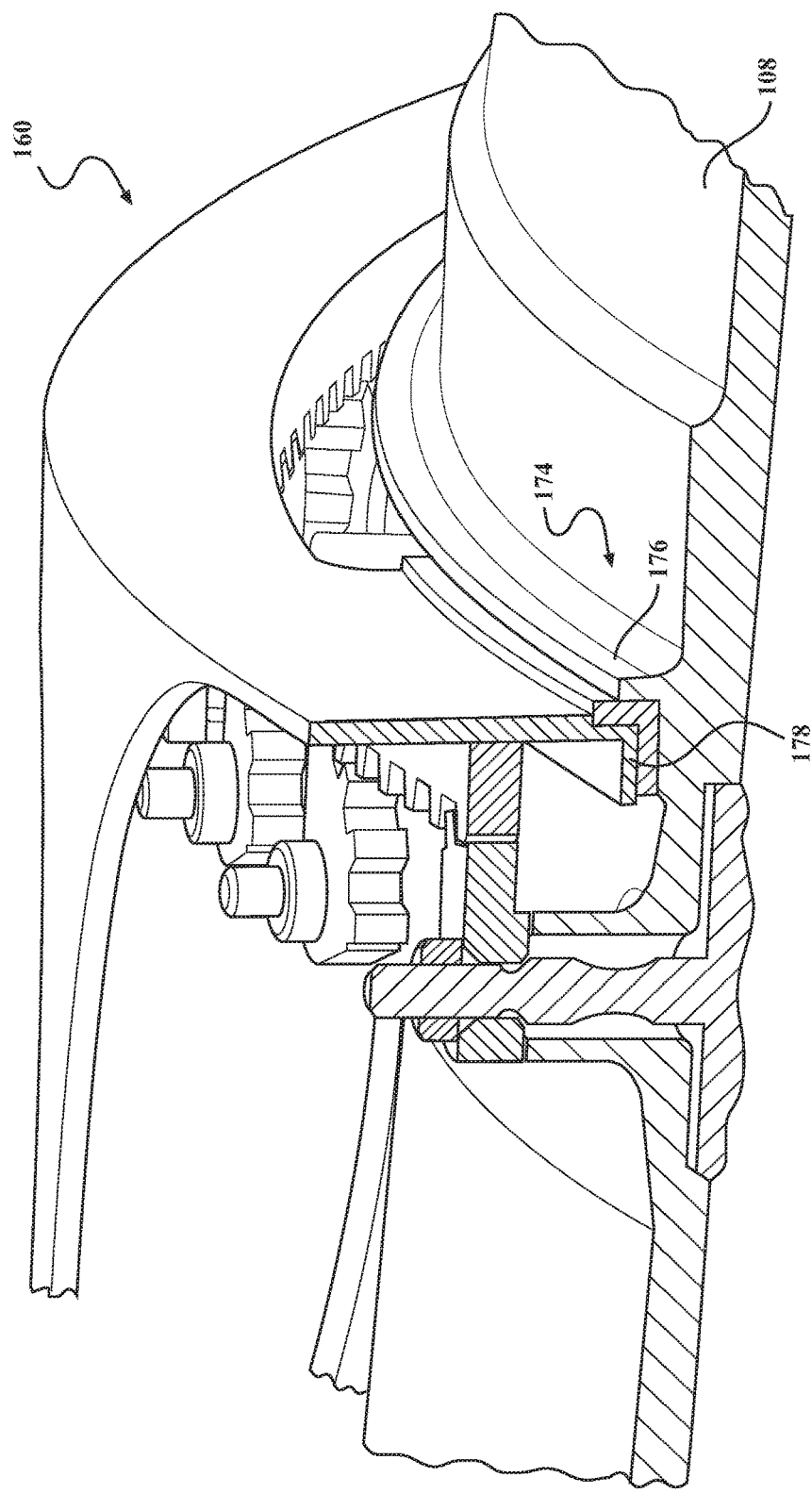
FIG. 11B is an expanded sectional view of the unison ring of FIG. 11A.

With reference to FIG. 11B, the extended geared unison ring 160 includes an interface 174 with the outer case 108. The outer case 108 may include a flange 176 to restrain axial movement of the extended geared unison ring 160. Low friction devices 178 such as bumpers of low friction material, rollers, or other devices may be alternatively, or additionally, provided.

Figure 12:
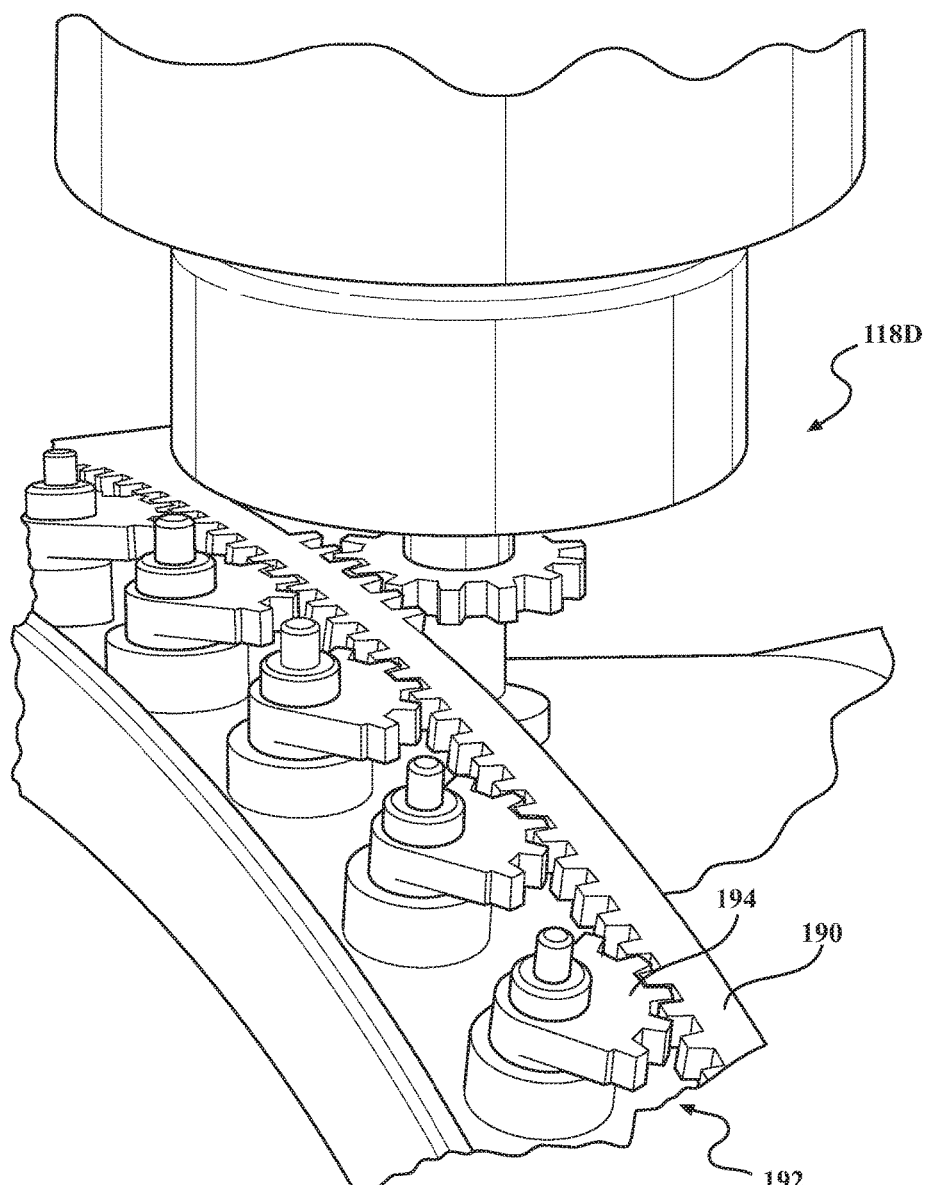
FIG. 12 is a schematic view of a variable vane system for a gas turbine engine according to one disclosed non-limiting embodiment.
Figure 13:
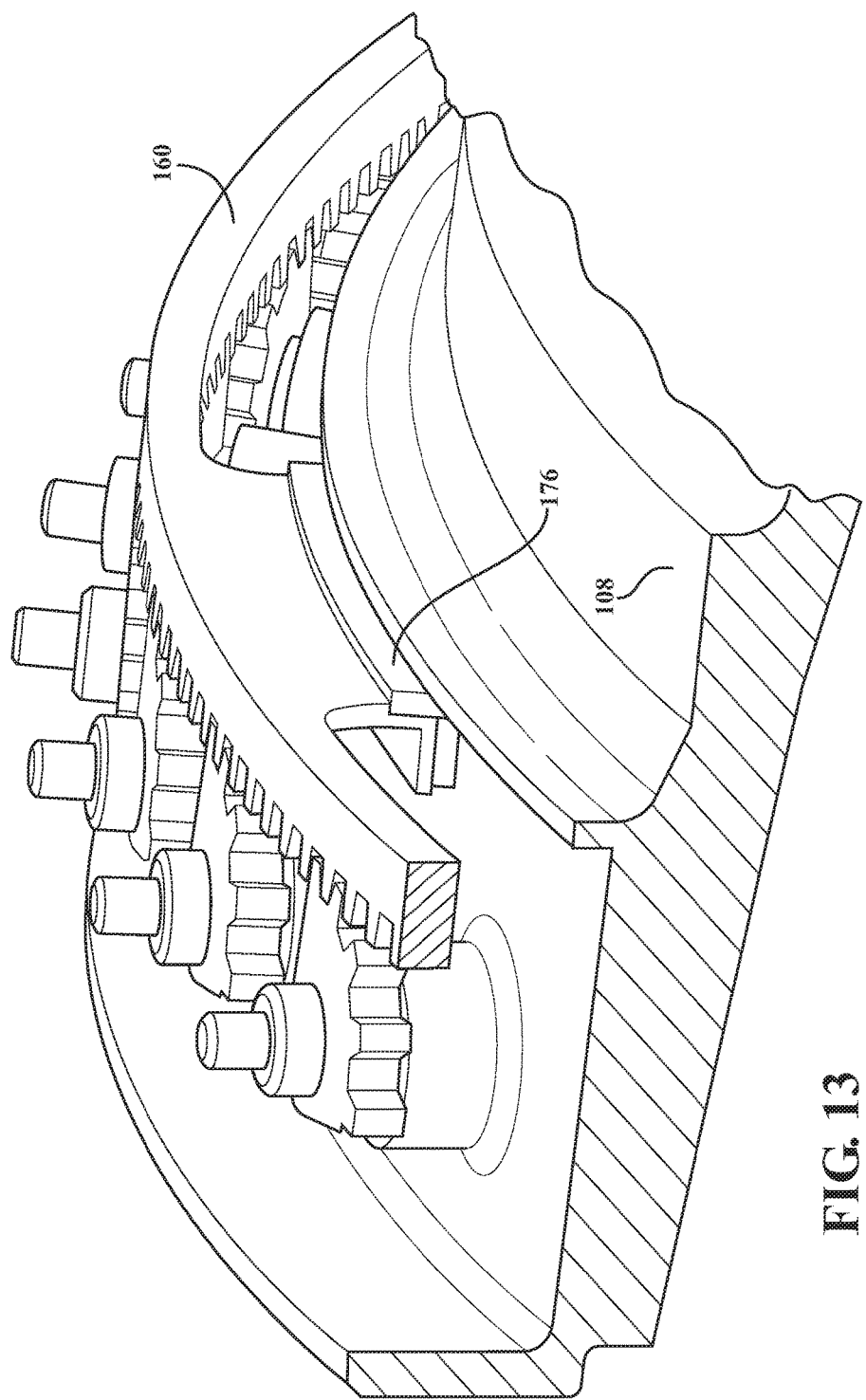
FIG. 13 is a expanded partial sectional view of a variable vane system for a gas turbine engine according to one disclosed non-limiting embodiment.

With reference to FIG. 12, in another disclosed embodiment, the actuator system 118D may utilize a geared unison ring 190 to drive a first variable vane stage 192 with a vane gear 194 mounted to each first stage variable vane trunion 106. A flange 176, or flange segments, may axially restrain the geared unison ring 160 on the outer case 108 to stabilize the geared unison ring 160 and avoid hysteresis (FIG. 13).

Figure 14:
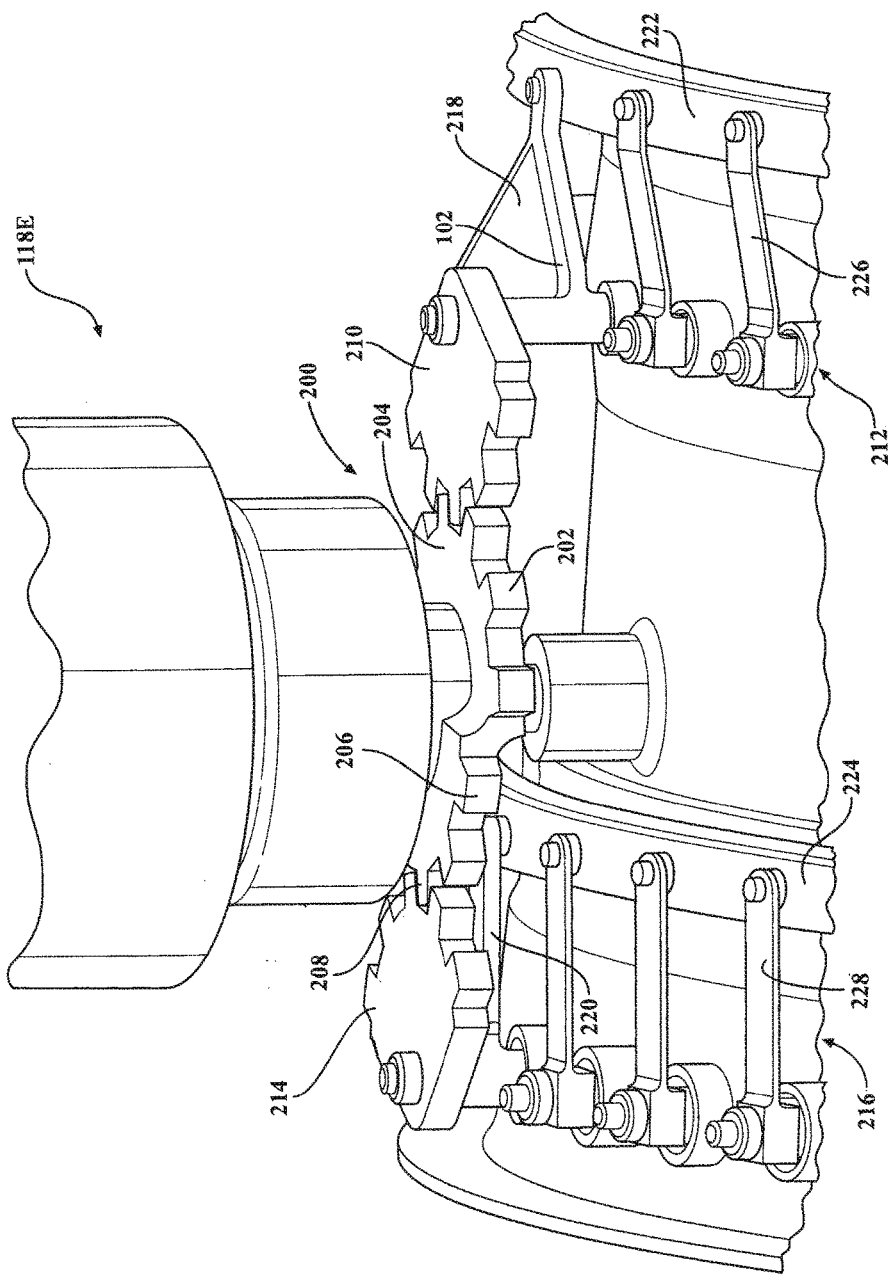
FIG. 14 is a schematic view of a variable vane system for a gas turbine engine according to one disclosed non-limiting embodiment.

With reference to FIG. 14, in another disclosed embodiment, the actuator system 118E may utilize a multi-planar gear 200. The multi-planar gear 200 includes a first set of gear teeth 202 in a first plane 204 and a second set of gear teeth 206 in a second plane 208.

The first plane 204 and the second plane 208 are offset such that the first set of gear teeth 202 are in mesh with a first drive gear 210 for a drive variable vane 102 in a first stage 212 and the second set of gear teeth 206 in mesh with a second drive gear 214 for a drive variable vane 102 in a second stage 216. The first drive gear 210 and the second drive gear 214 may be arranged at different heights to interface with the multi-planar gear 200. Since actuation requires only partial rotation, symmetry of the multi-planar gear 200 is not necessary. The gear ratio can be adjusted to provide different vane rotations per stage.

The first drive gear 210 and the second drive gear 214 also include a drive arm 218, 220 to rotate a respective unison ring 222, 224. The driven variable vanes 102 are connected their respective unison ring 222, 224 by a respective linkage 226,228 for each variable vane 102.

Figure 15:
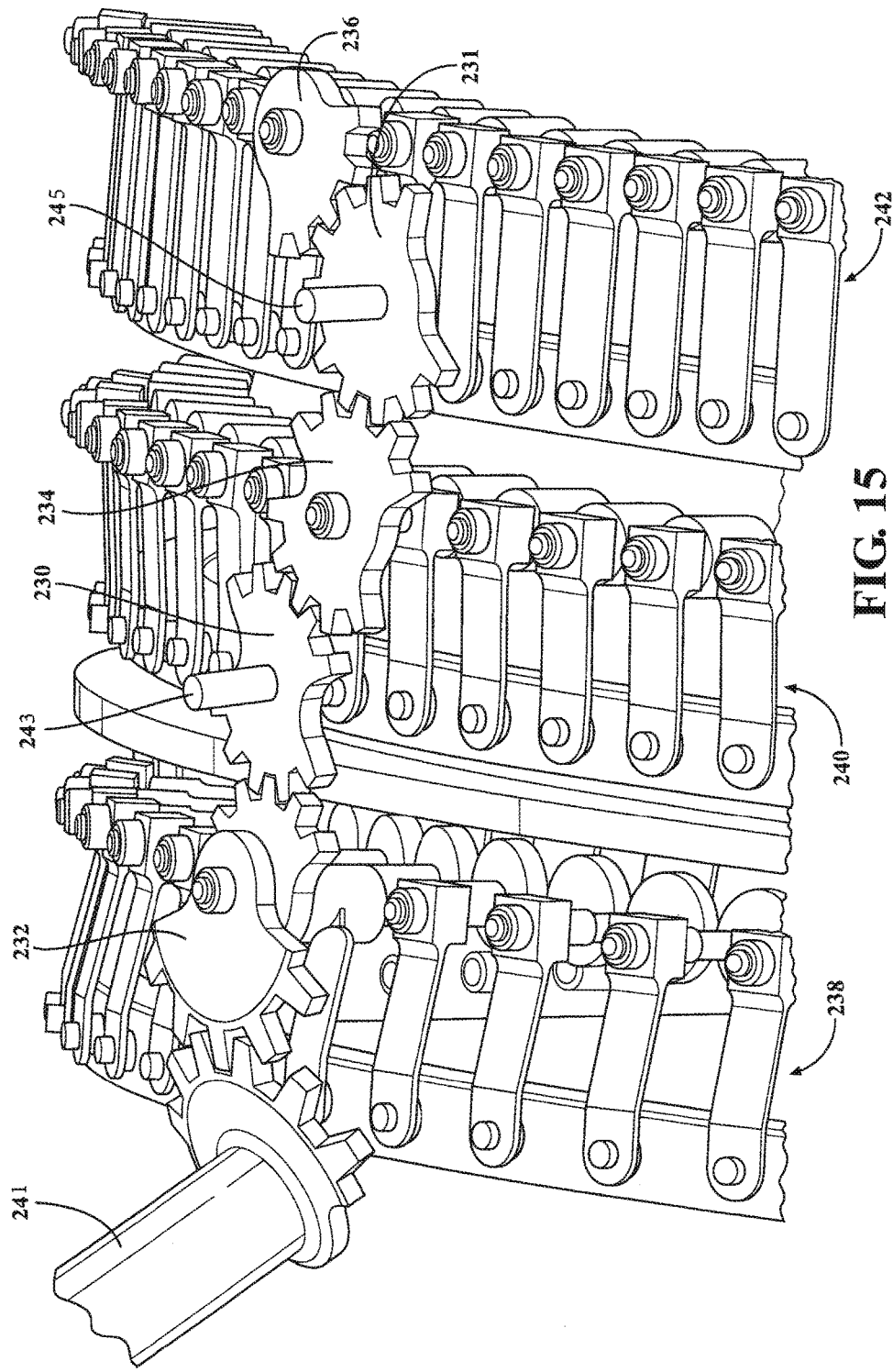
FIG. 15 is a schematic view of a variable vane system for a gas turbine engine according to one disclosed non-limiting embodiment.

With reference to FIG. 15, in another disclosed embodiment, the actuator system 118E may include a multiple of idler gears 230, 231 that interconnect drive gears 232, 234, 236 of each of a multiple of stages 238, 240, 242. Each of the multiple of idler gears 230 may be mounted to static structure (not shown) through a shaft 241, 243, 245 such that the multiple of idler gears 230 may be positioned above the variable vane structure. Alternatively, the idler gears 230 may be mounted directly to a variable vane to direct drive a driving vane.

In this embodiment, a multi-planar gear 232 may be driven by a drive shaft 241 driven by a remote actuator.

Figure 16:
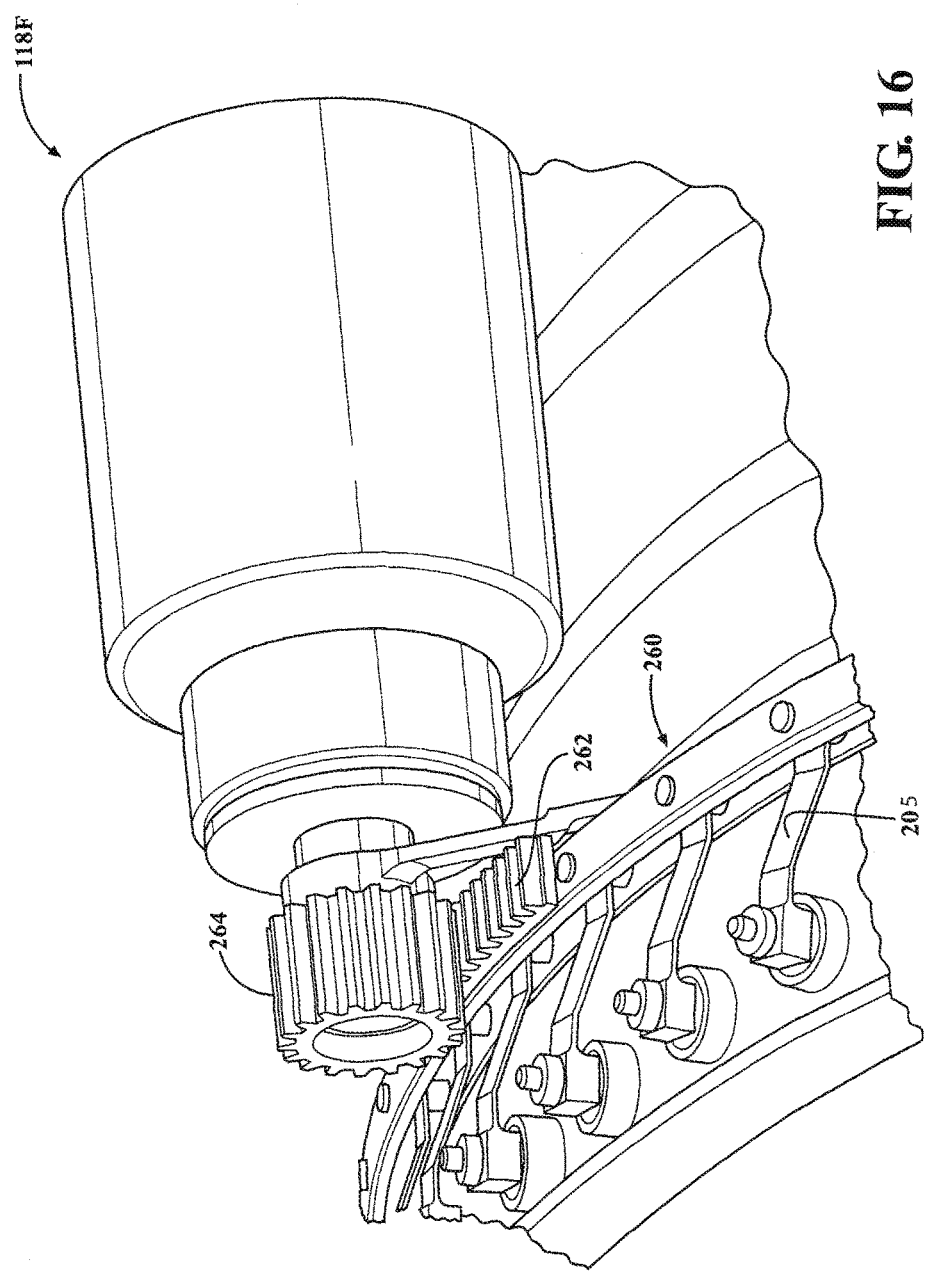
FIG. 16 is a schematic view of a variable vane system for a gas turbine engine according to one disclosed non-limiting embodiment.

With reference to FIG. 16, in another disclosed embodiment, the actuator system 118F may utilize a geared unison ring 260. The geared unison ring 260 locates a gear 262 on an outer diameter of the geared unison ring 260.

Figure 17:
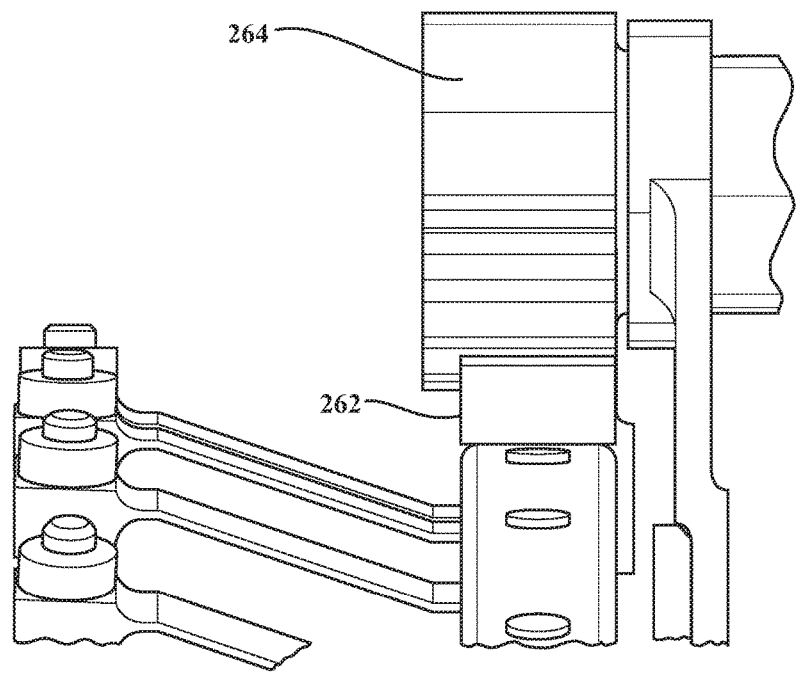
FIG. 17 is a schematic view of the variable vane system of FIG. 16 in a first position.
Figure 18:
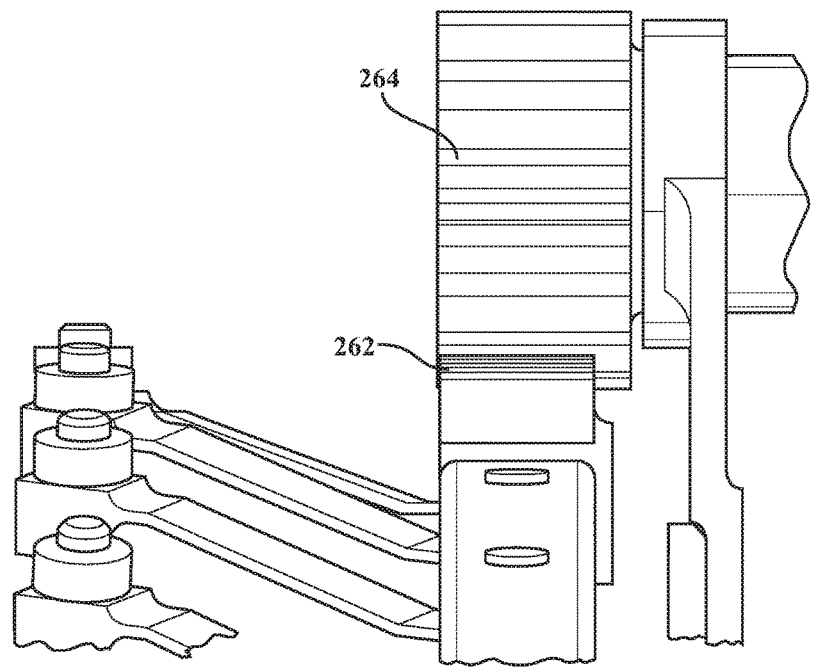
FIG. 18 is a schematic view of the variable vane system of FIG. 16 in a second position.

Rotation of the geared unison ring 260 by the actuator system 118F drives the individual variable vanes 102 through the respective drive arms 205. The actuator system 118F is generally axial with the engine axis A for installations with limited vertical packaging space. The actuator system 118F drives a drive gear 264 that is wider than the gear 262 as the rotation of the unison ring 260 results in a relatively small amount of axial motion (FIGS. 17 and 18). This will require a small amount of sliding between gear teeth of the gears 262, 264, but the rotation required to actuate the variable vanes is relatively small, typically, only a few degrees, and the actuation is slow, so a small amount of sliding may be acceptable.

Figure 19:
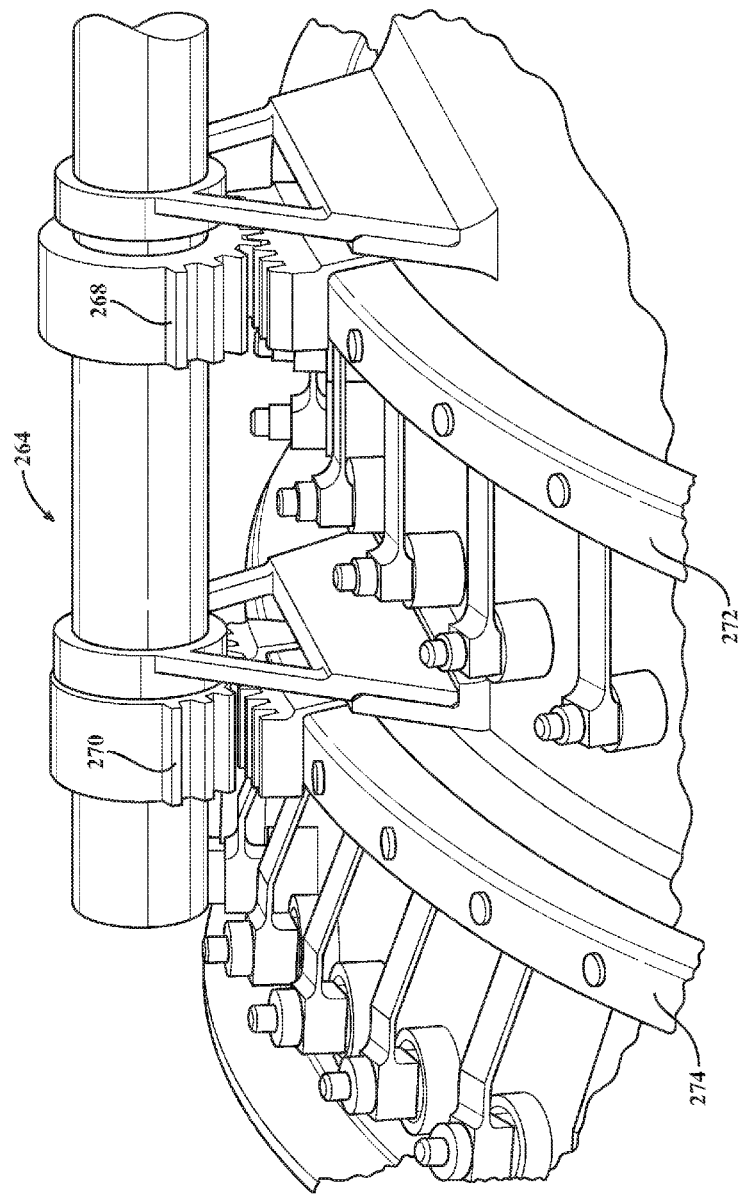
FIG. 19 is a schematic view of a variable vane system for a gas turbine engine according to one disclosed non-limiting embodiment.

With reference to FIG. 19, in another disclosed embodiment, the drive gear 264 may be an extended shaft with a multiple of gear segments 268, 270 to drive a respective multiple of unison rings 272, 274.

Figure 20:
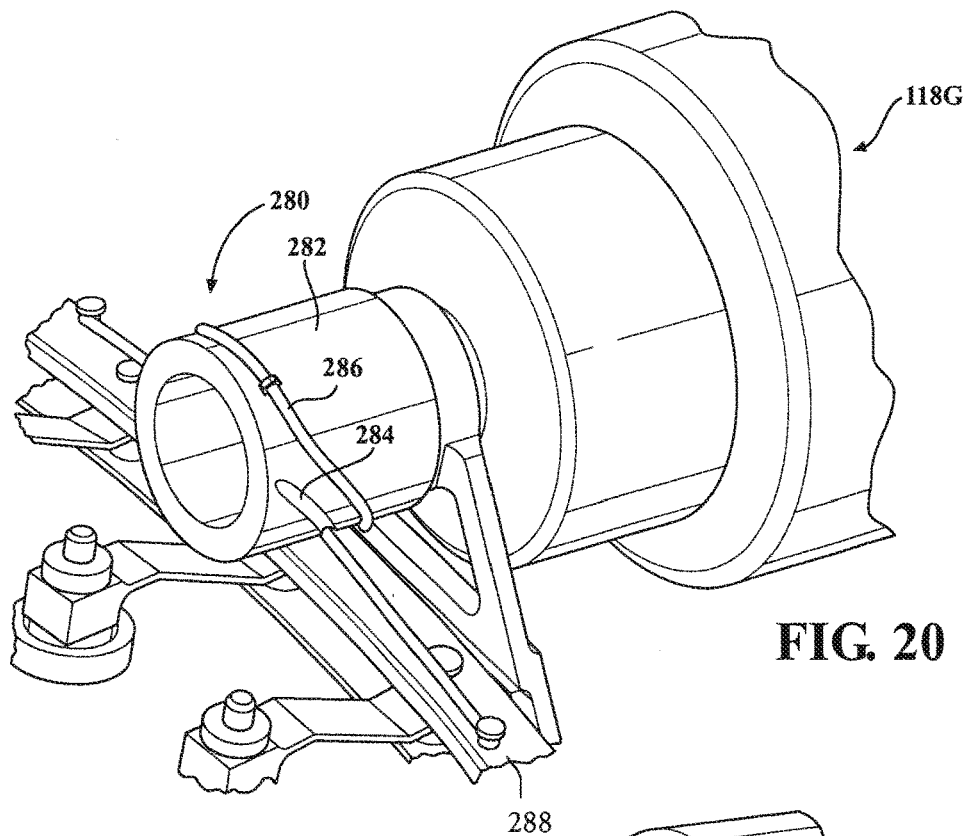
FIG. 20 is a schematic view of a variable vane system for a gas turbine engine according to one disclosed non-limiting embodiment.
Figure 21:
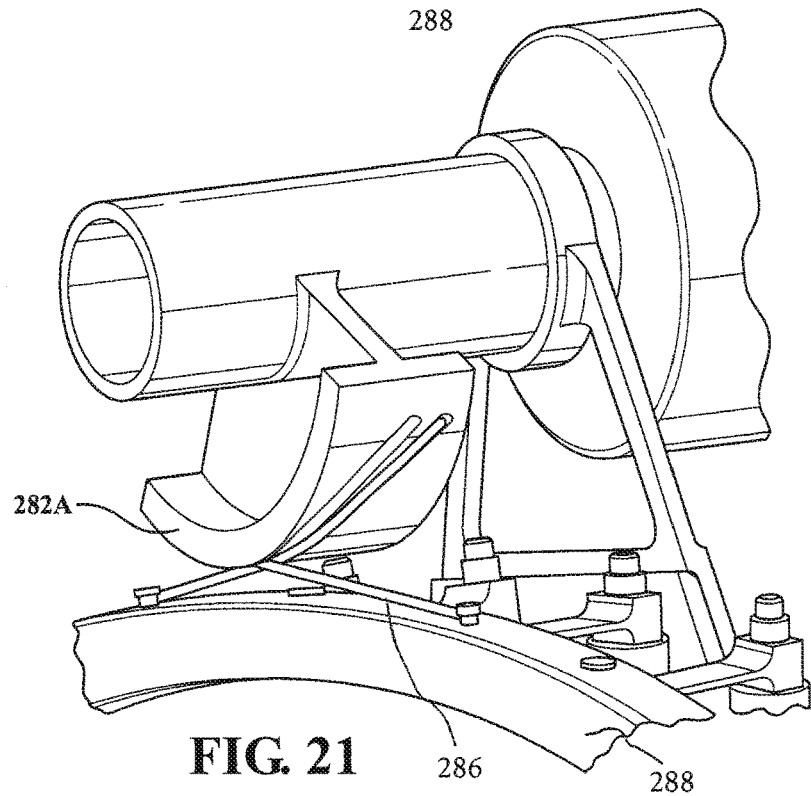
FIG. 21 is a schematic view of a variable vane system for a gas turbine engine according to one disclosed non-limiting embodiment.

With reference to FIG. 20, in another disclosed embodiment, the actuator system 118G may utilize a cable drive system 280. The cable drive system 280 includes a drum 282, or alternatively, a drum segment 282A (FIG. 21) with a groove 284 within which a cable 286 is at least partially received.

Figure 22:
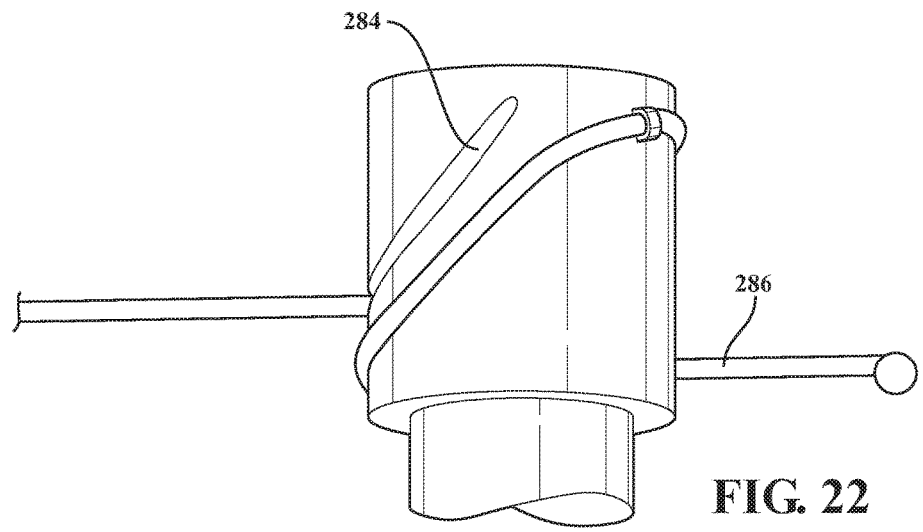
FIG. 22 is a schematic view of a variable vane system for a gas turbine engine according to one disclosed non-limiting embodiment.
Figure 23:
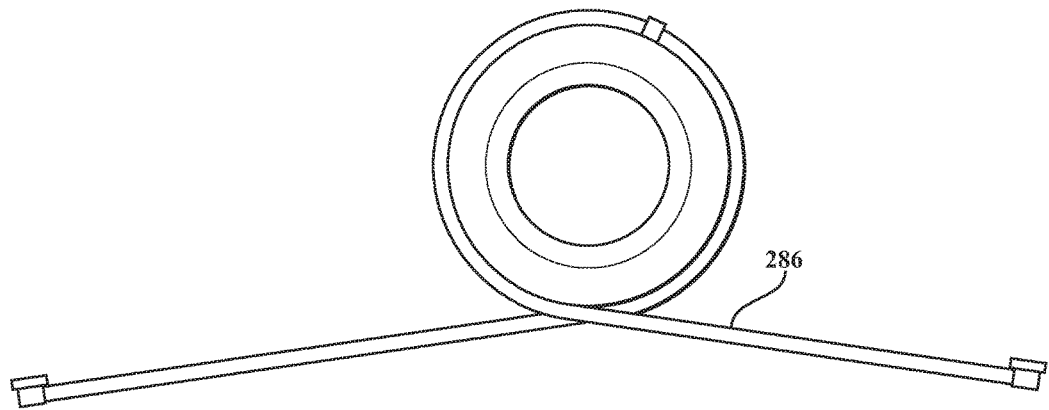
FIG. 23 is a schematic view of a variable vane system for a gas turbine engine according to one disclosed non-limiting embodiment.

The groove 284 defines a contoured path to guide the cable 286 (FIG. 22, 23). The cable 286 defines a path that is contoured to avoid slack in the cable 286. Alternatively, a tension-loading device may be used. The cable 286 is connected to the unison ring 288 such that cable 286 will always remain tangential to the unison ring 288.

Figure 24:
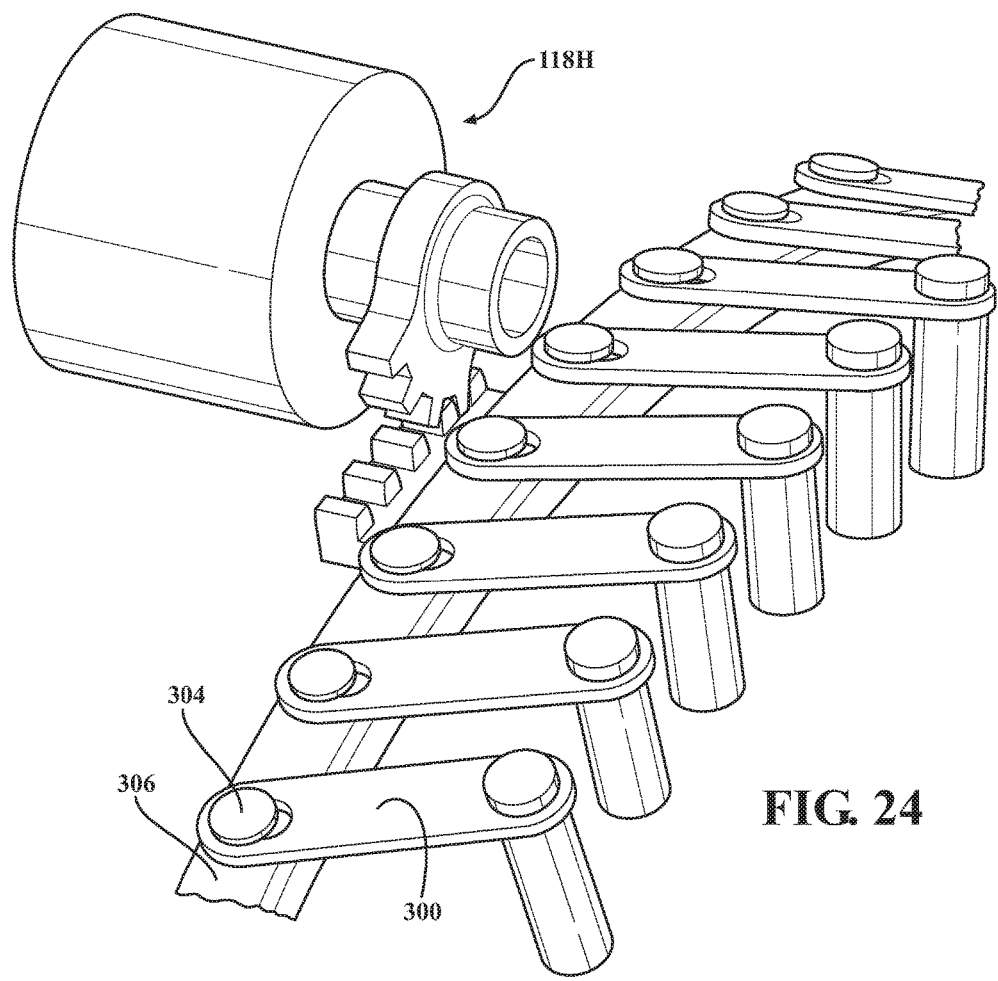
FIG. 24 is a schematic view of a variable vane system for a gas turbine engine according to one disclosed non-limiting embodiment.
Figure 25:
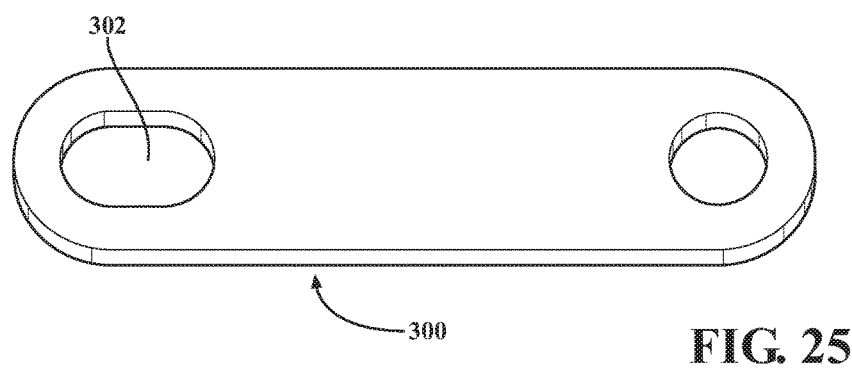
FIG. 25 is a plan view of a link for use in the system of FIG. 24.
Figure 26:
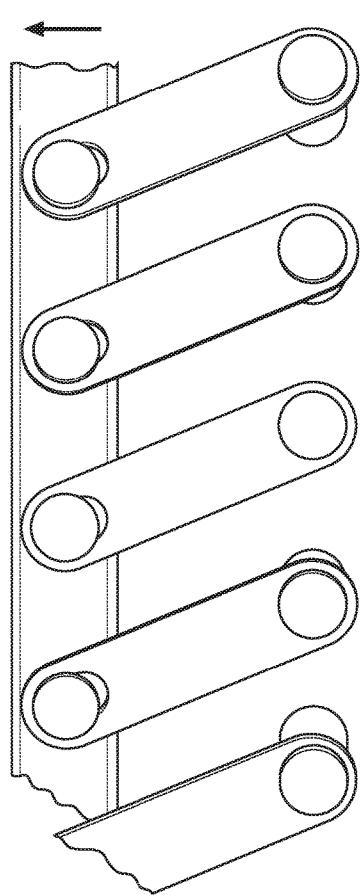
FIG. 26 is a schematic view of the variable vane system of FIG. 24 in a first position.
Figure 27:
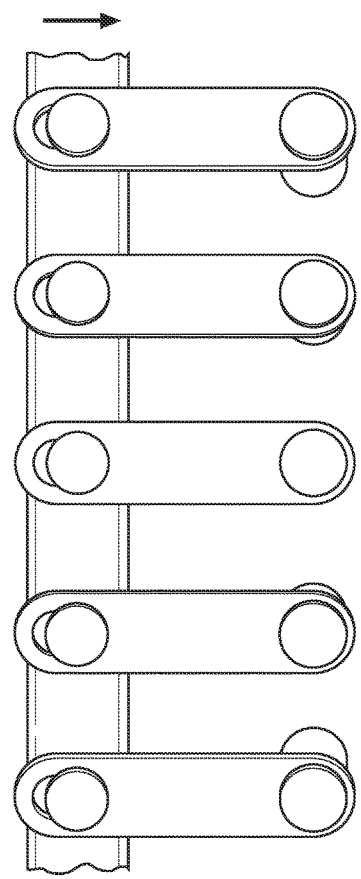
FIG. 27 is a schematic view of the variable vane system of FIG. 24 in a second position.
Figure 28:
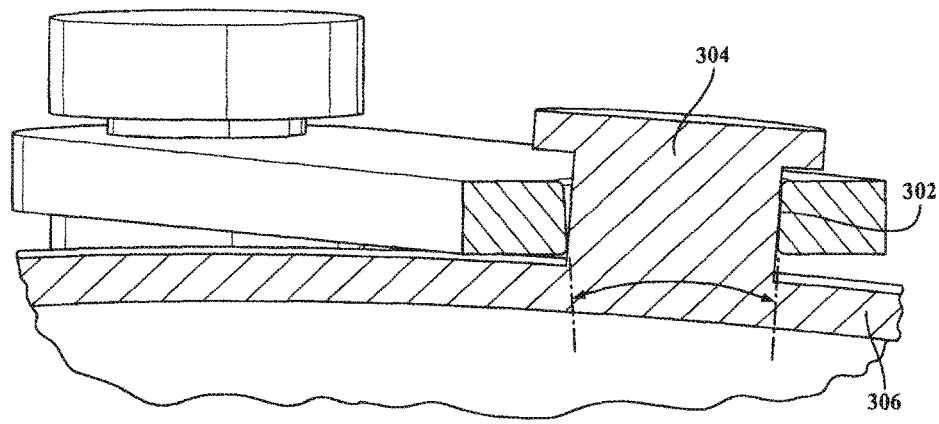
FIG. 28 is a sectional view of the link of FIG. 25.

With reference to FIG. 24, in another disclosed embodiment, the actuator system 118H may utilize a multiple of drive arms 300 which actuate the individual variable vanes 102. Each of the multiple of drive arms 300 includes a slot 302 that permits single point actuation (FIG. 25). Each slot 302 for each drive arm 300 receives a respective pin 304 that extends from the unison ring 306. The axial motion is absorbed (FIGS. 26 and 27) in the slots 302 of the individual links, so that the unison ring 306 is effectively stabilized, even with single point actuation. Each respective pin 304 that extends from the unison ring 306 and/or slot 302 may be tapered to permit rotation of the unison ring 306 with minimal play (FIG. 28).

Figure 29:
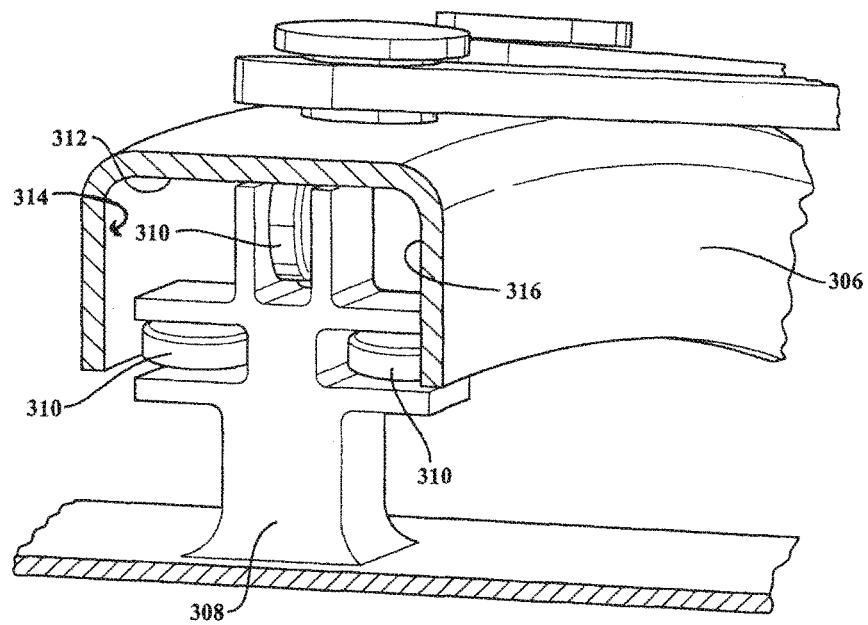
FIG. 29 is a sectional view of a unison ring for a variable vane system for a gas turbine engine according to one disclosed non-limiting embodiment.

With reference to FIG. 29, the unison ring 306 has a "U" shaped cross section that provides significant stiffness while being light in weight. The unison ring 306 is supported on the engine case by a multiple of supports 308 that are arranged around the engine case. The support 308 may be generally cross-shaped to support a multiple of rollers 310. In this example, each roller 310 interacts with an upper surface 312, a forward surface 314, and an aft surface 316 of the unison ring 306.

Figure 30:
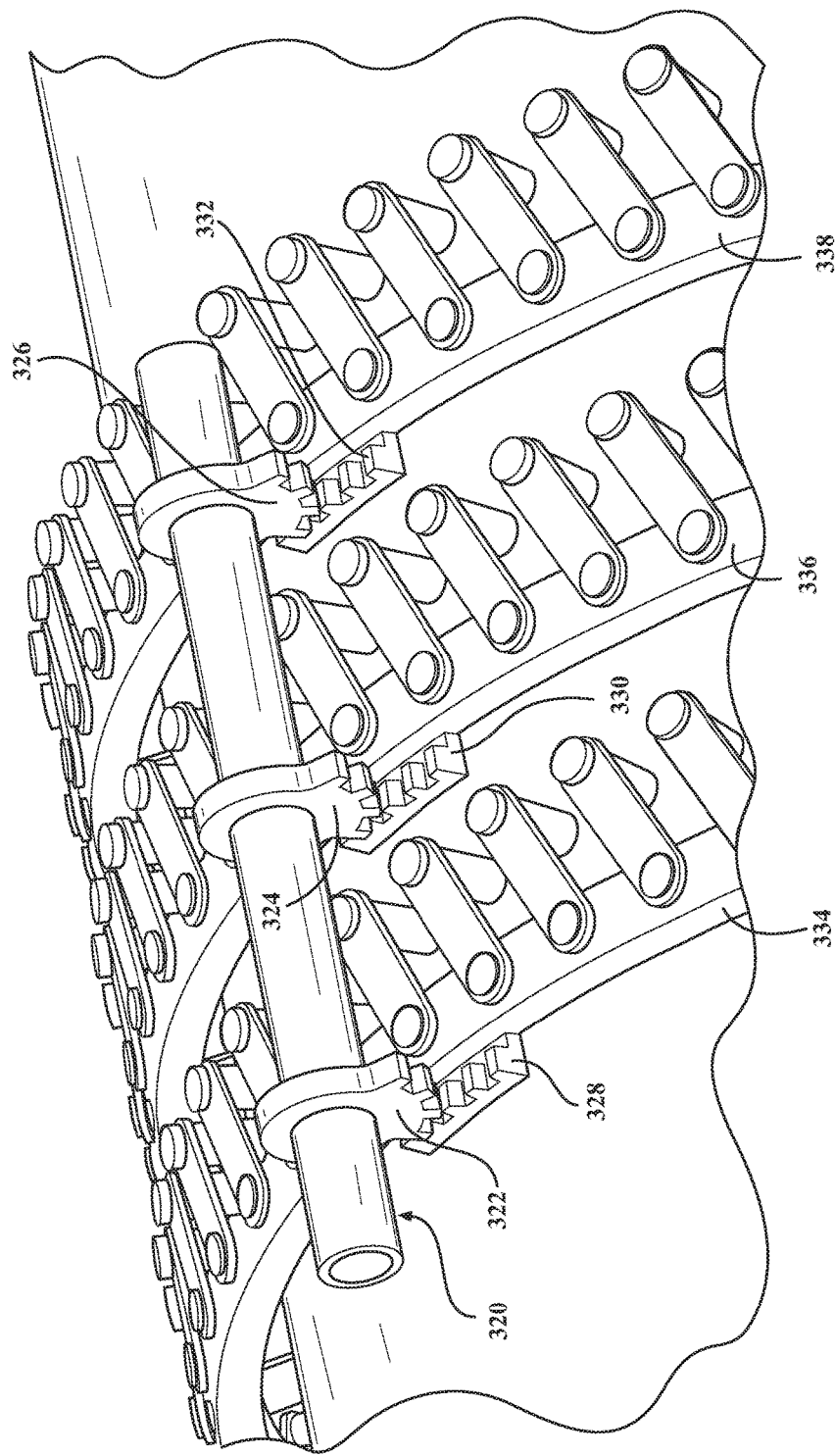
FIG. 30 is a schematic view of a variable vane system for a gas turbine engine according to one disclosed non-limiting embodiment.

With reference to FIG. 30, a single drive shaft 320 may include multiple drive gears 322, 324, 326 meshed with respective gear racks 328, 330, 332 of the associated unison rings 334, 336, 338 of each variable vane stage. The gear racks 328, 330, 332 are axially offset on the unison ring 334, 336, 338 to provide an extremely low profile.

Figure 31:
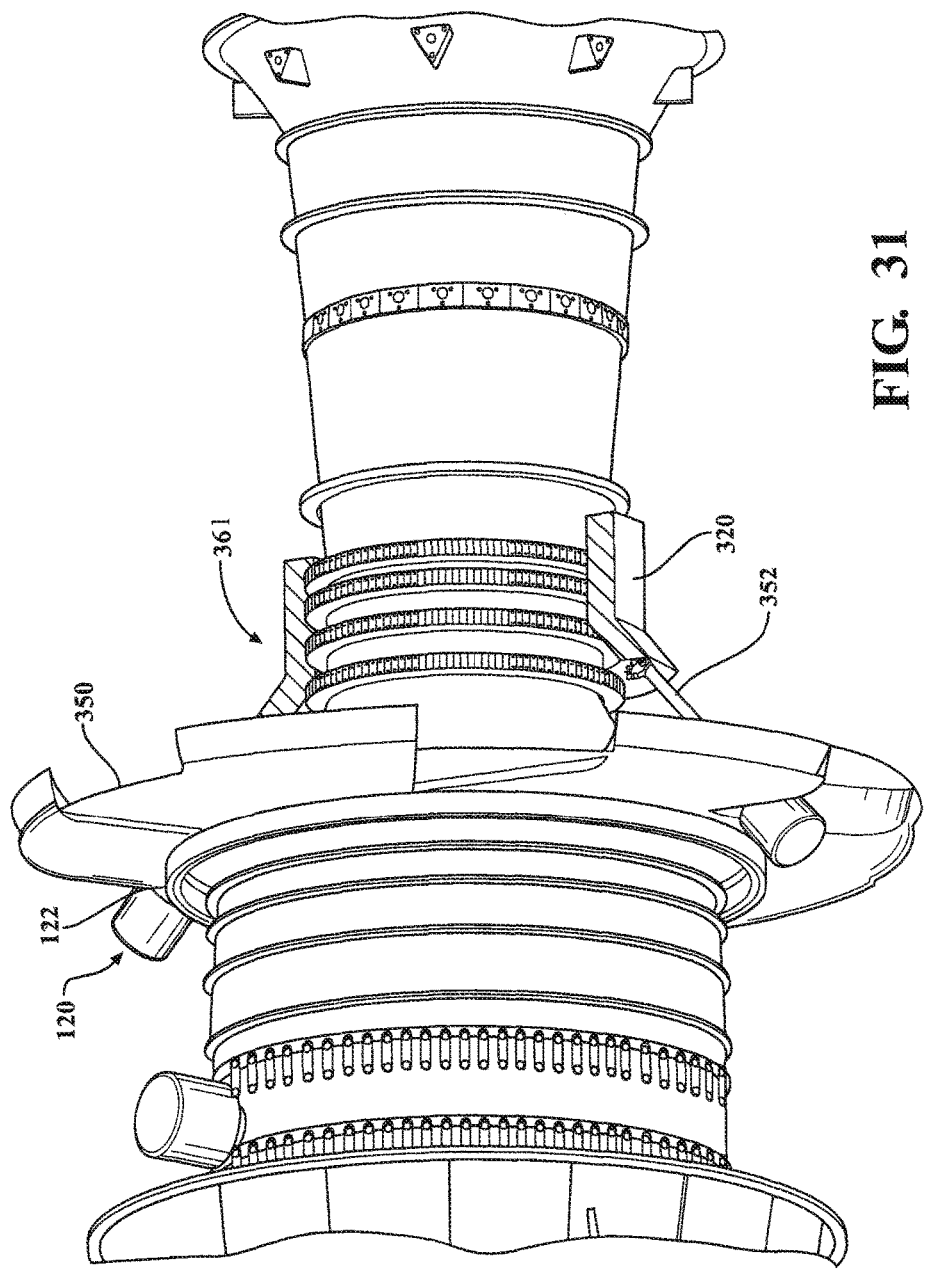
FIG. 31 is a perspective view of a variable vane system for a gas turbine engine according to one disclosed non-limiting embodiment.
Figure 32:
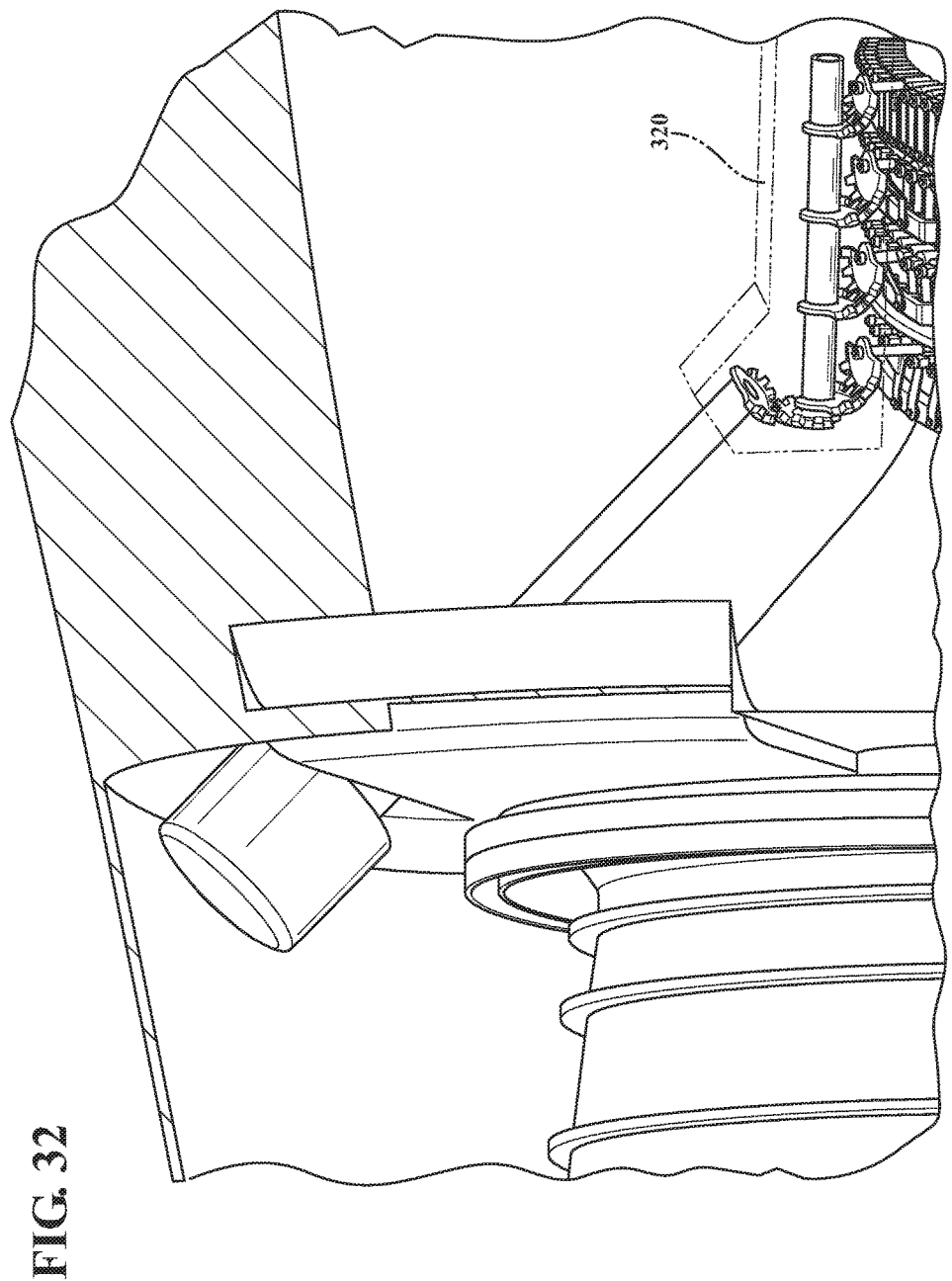
FIG. 32 is a sectional view of the variable vane system of FIG. 31.

With reference to FIG. 31, in another disclosed embodiment, the actuator 120 and the harmonic drive 122 are remotely located on one side of a firewall 350 with a drive shaft 352 from the harmonic drive 122 that extends therethrough to drive a HPC variable vane system 361 which is in a higher temperate environment. The extended drive shaft 352 permits the actuator 120 and the harmonic drive 122 to be located in a desirable environment. The extended drive shaft 352 may mesh with the single drive shaft 320 to drive a multiple of variable vane stages (FIG. 32).

Figure 33:
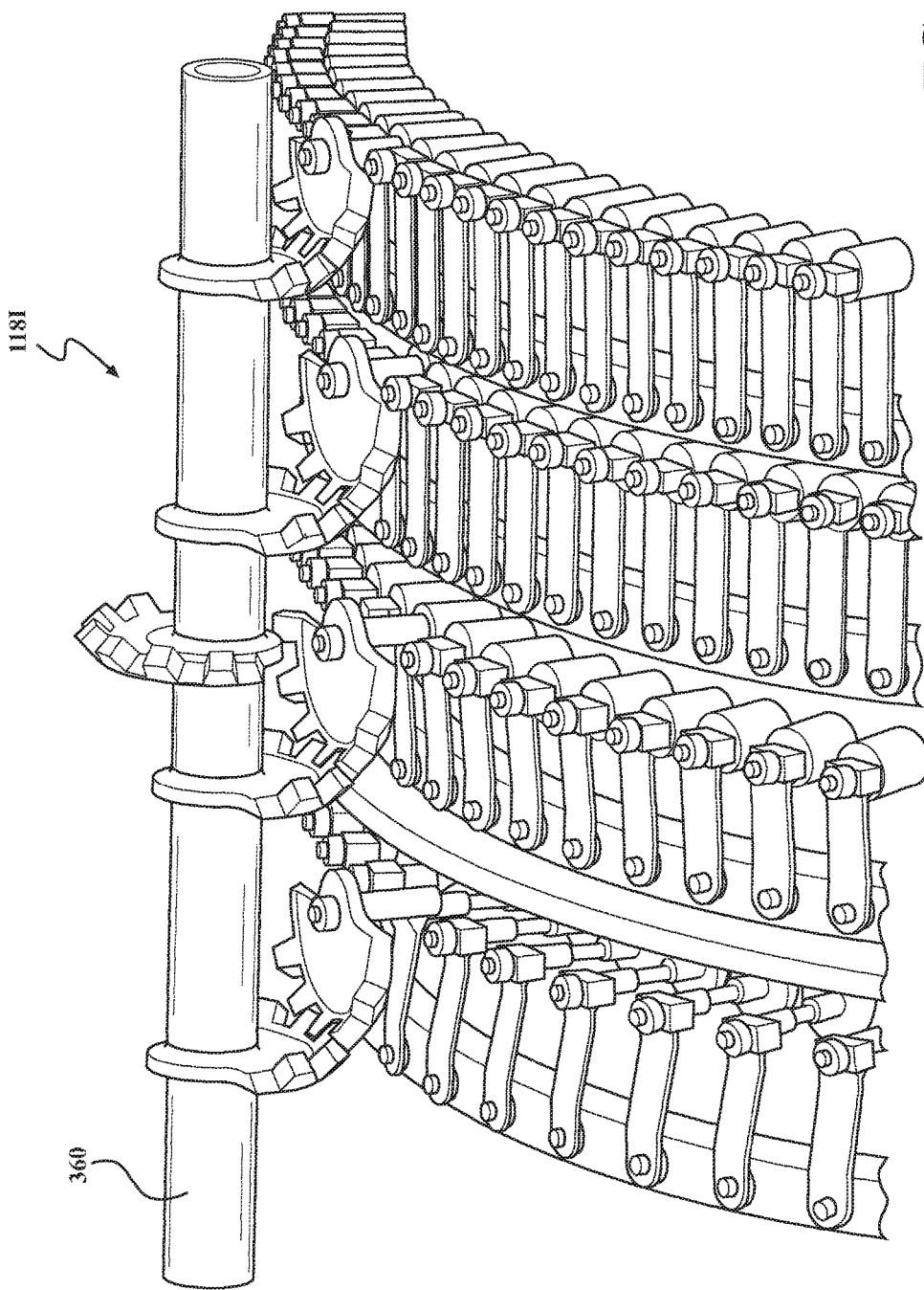
FIG. 33 is a perspective view of a variable vane system for a gas turbine engine according to one disclosed non-limiting embodiment.

With reference to FIG. 33, in another disclosed embodiment, an actuator system 118I includes a drive shaft 360 operable to control multiple stages of variable vanes (four shown).

Figure 34:
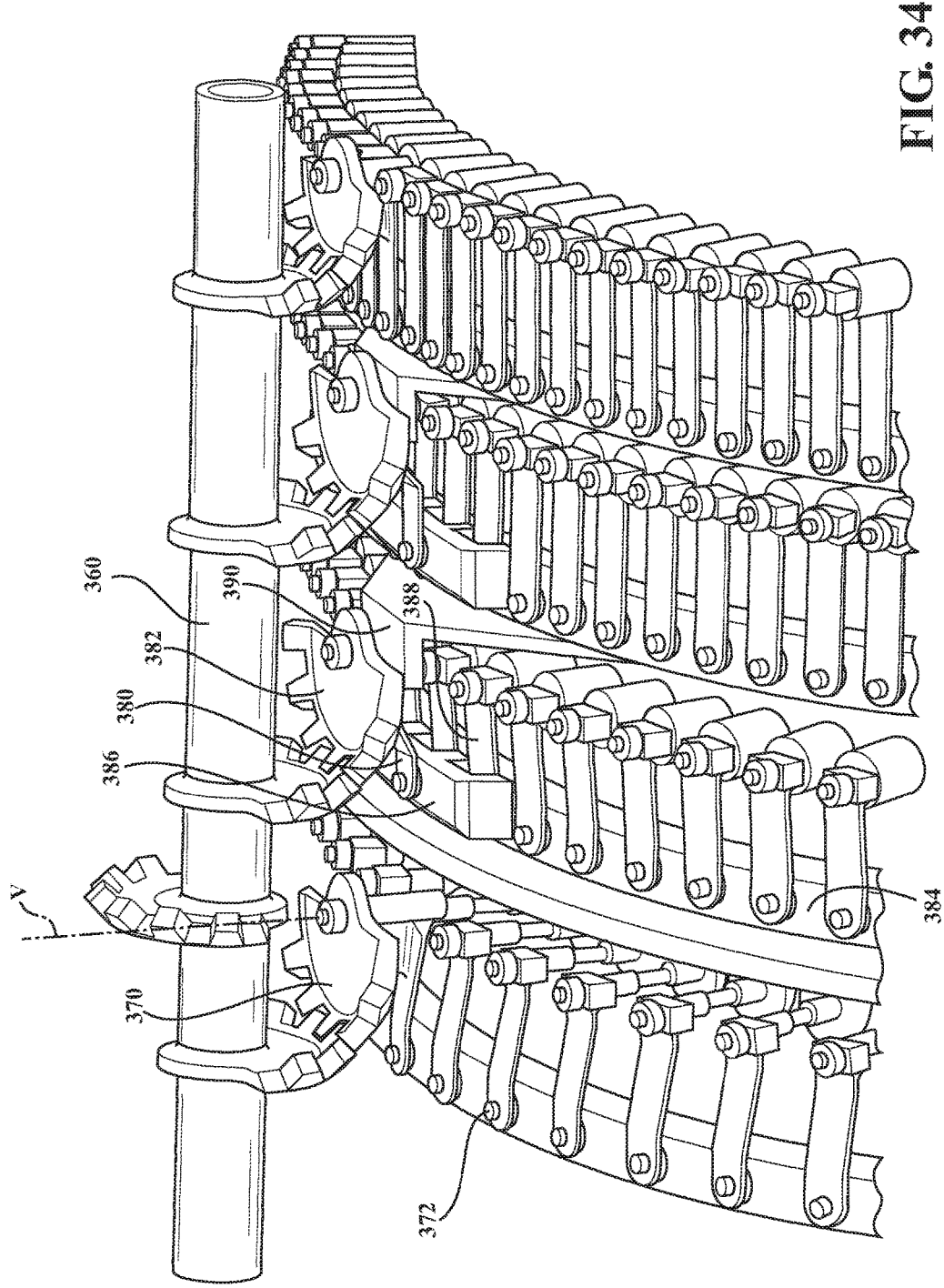
FIG. 34 is a perspective view of a variable vane system for a gas turbine engine according to one disclosed non-limiting embodiment.

With reference to FIG. 34, in another disclosed embodiment, if an axis V of the variable vane is aligned planer with the drive shaft 360, a vane drive bevel gear 370 may drive a unison ring 372, and thus all the variable vanes 102 (FIG. 3) in a direct manner.

Alternatively, an additional actuation arm 380 may extend from the vane drive bevel gear 382 to provide the same linkage motion to the unison ring 384 as the actuation arms on the variable vanes, but is aligned to the bevel gear 382. The unison ring 384 may include a bridge 386 which bridges a subset of a multiple of variable vane drive arms 388. That is, the bridge 386 is mounted to the unison ring 384 to which the multiple of variable vane drive arms 388 are attached. The actuation arm 380, since not tied directly to a variable vane, is mounted to static structure 390.

Figure 35:
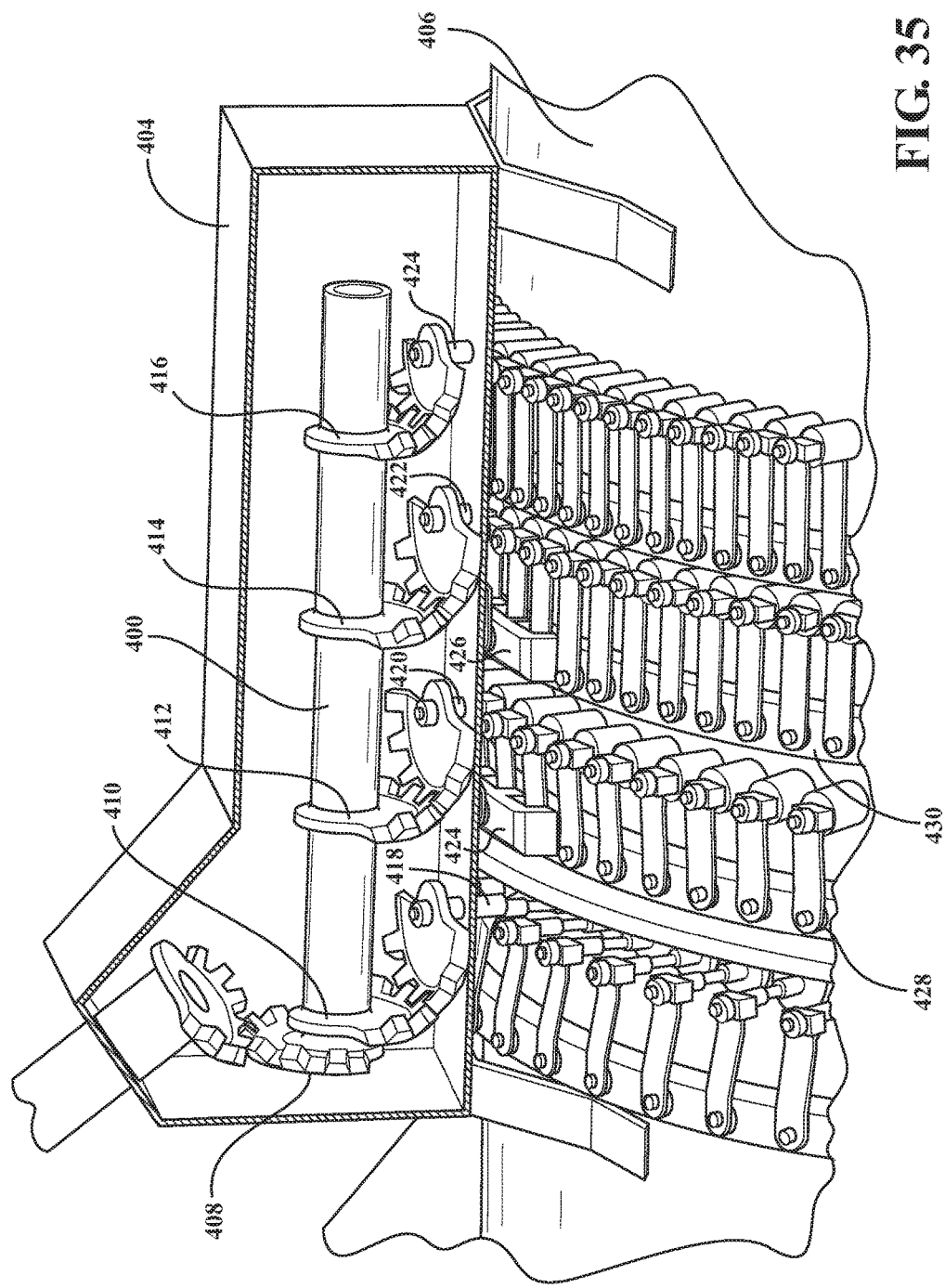
FIG. 35 is a perspective view of a variable vane system for a gas turbine engine according to one disclosed non-limiting embodiment.

With reference to FIG. 35, in another disclosed embodiment, a drive shaft 400 and gears 402 may be enclosed in a gear box 404 that is mounted to an engine case 406. The drive shaft 400 has a single input 408 and a multiple of outputs 410, 412, 414, 416.

The gearbox 404 may house all the necessary supports and bearings and may be mounted directly to the engine case 406 such as a HPC case. The gearbox 404 also provides a static structure from which to rotationally mount the variable vane actuation arms 420, 422 that are not tied directly to a variable vane 418, 424. The variable vane actuation arms 420, 422 may be mounted to a bridge 424, 426 that is mounted to the respective unison ring 428, 430.

Figure 36:
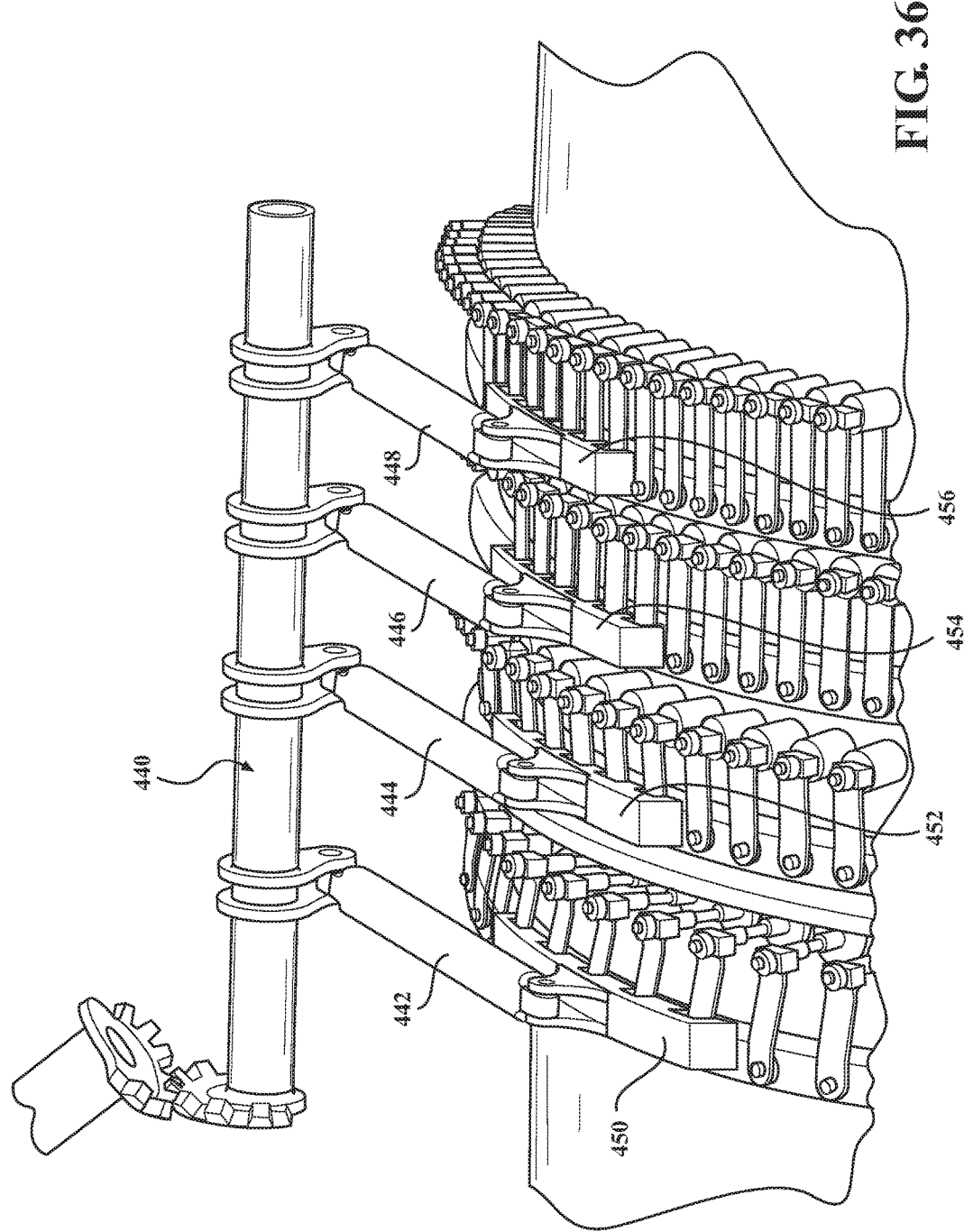
FIG. 36 is a perspective view of a variable vane system for a gas turbine engine according to one disclosed non-limiting embodiment.

With reference to FIG. 36, in another disclosed embodiment, a drive shaft 440 drives a multiple of links 442 (four shown) which drive a bridge 450-456 to respective unison ring. Although the links 442-448 are shown as linear, the links may alternatively be curved to conform the curvature of the case to provide a more compact package. Alternatively still, if there is sufficient space between stages, the bridge 450-456 may be mounted to a side of the respective unison ring to provide a more compact mechanism.

Figure 37:
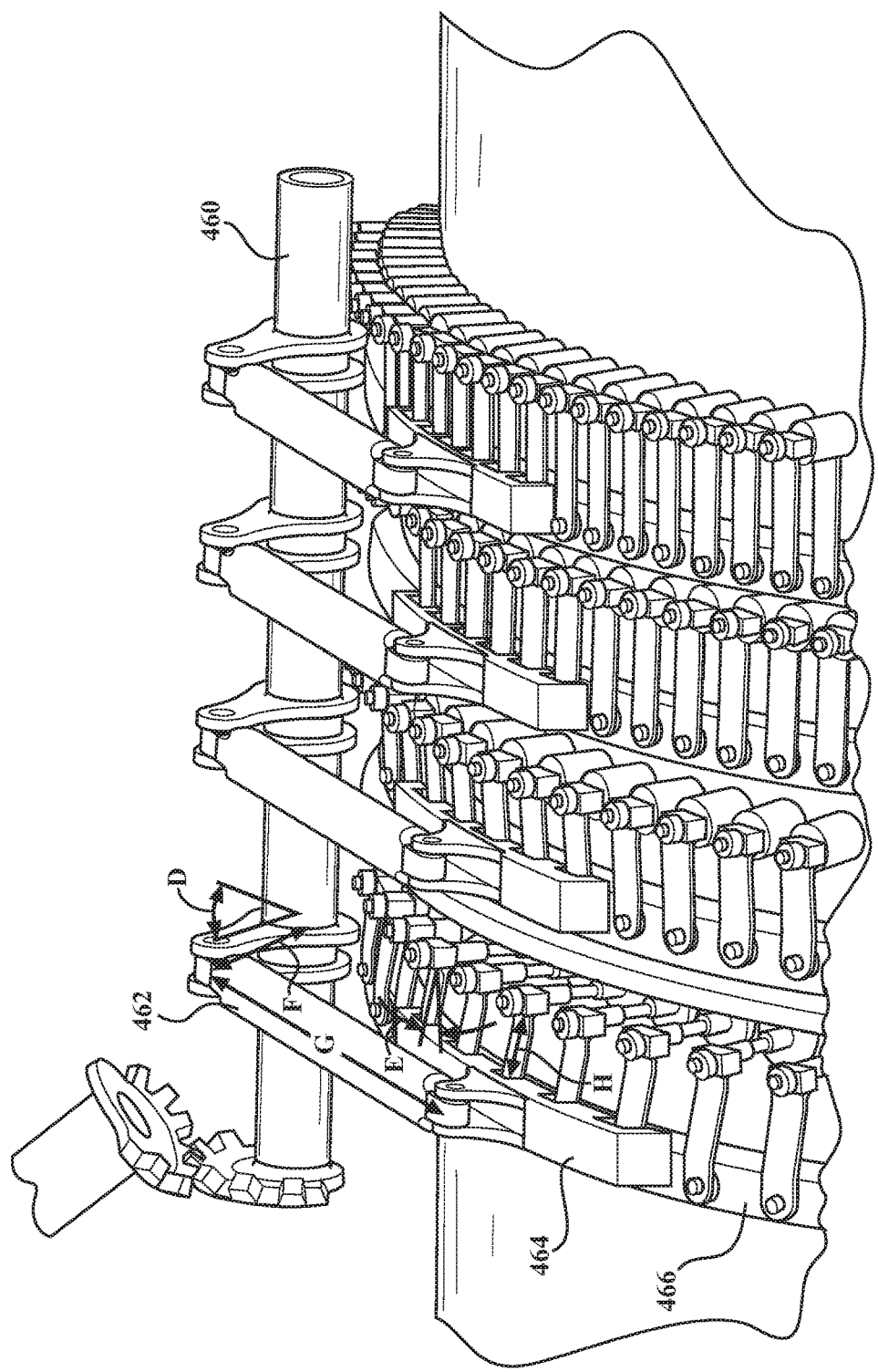
FIG. 37 is a perspective view of a variable vane system for a gas turbine engine according to one disclosed non-limiting embodiment.

With reference to FIG. 37, in another disclosed embodiment, a drive shaft 460 drives a multiple of links 462 (four shown) which drive a bridge 464 to respective unison ring 466. The links 462 are driven to provide a linear relationship between the vane rotation angles across all the stages. That is, as the first stage vane angle changes, each of the other stages will change based on a fixed ratio off the first. Alternatively, a non-linear relationship may be provided for optimal performance. The non-linear relationship may be optimized as, for each stage, there are 5 variables available: 2 initial angles (D, E) and three lengths (F, G, H). These variables may be specifically tailored to provide a resultant output from the drive shaft 460 that differs for each stage (four shown).

Figure 38:
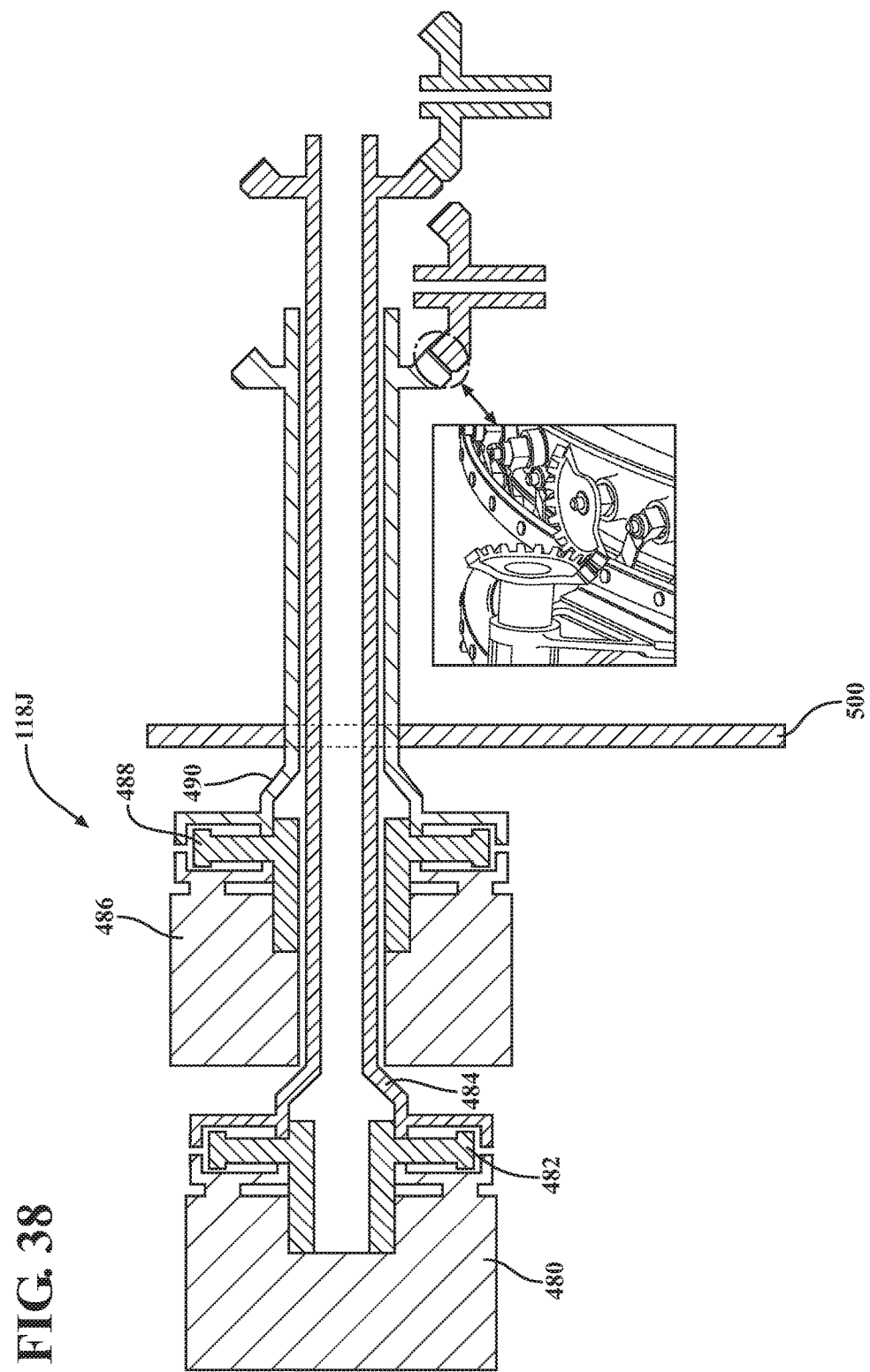
FIG. 38 is a sectional view of a variable vane system for a gas turbine engine according to one disclosed non-limiting embodiment.

With reference to FIG. 38, in another disclosed embodiment, an actuator system 118J may include a first actuator 480, a first harmonic drive 482, a first drive shaft 484, a second actuator 486, a second harmonic drive 488, and a second drive shaft 490. The actuators 480, 486 and the harmonic drives 482, 488 may be located on a side of firewall 500, that provides a thermally controlled environment. In one example, the thermally controlled environment is about 160 F. The first drive shaft 484 and the second drive shaft 490 are coaxial and pass through the firewall 500 into a higher temperature environment of, for example, 200 F-600 F.

Figure 39:
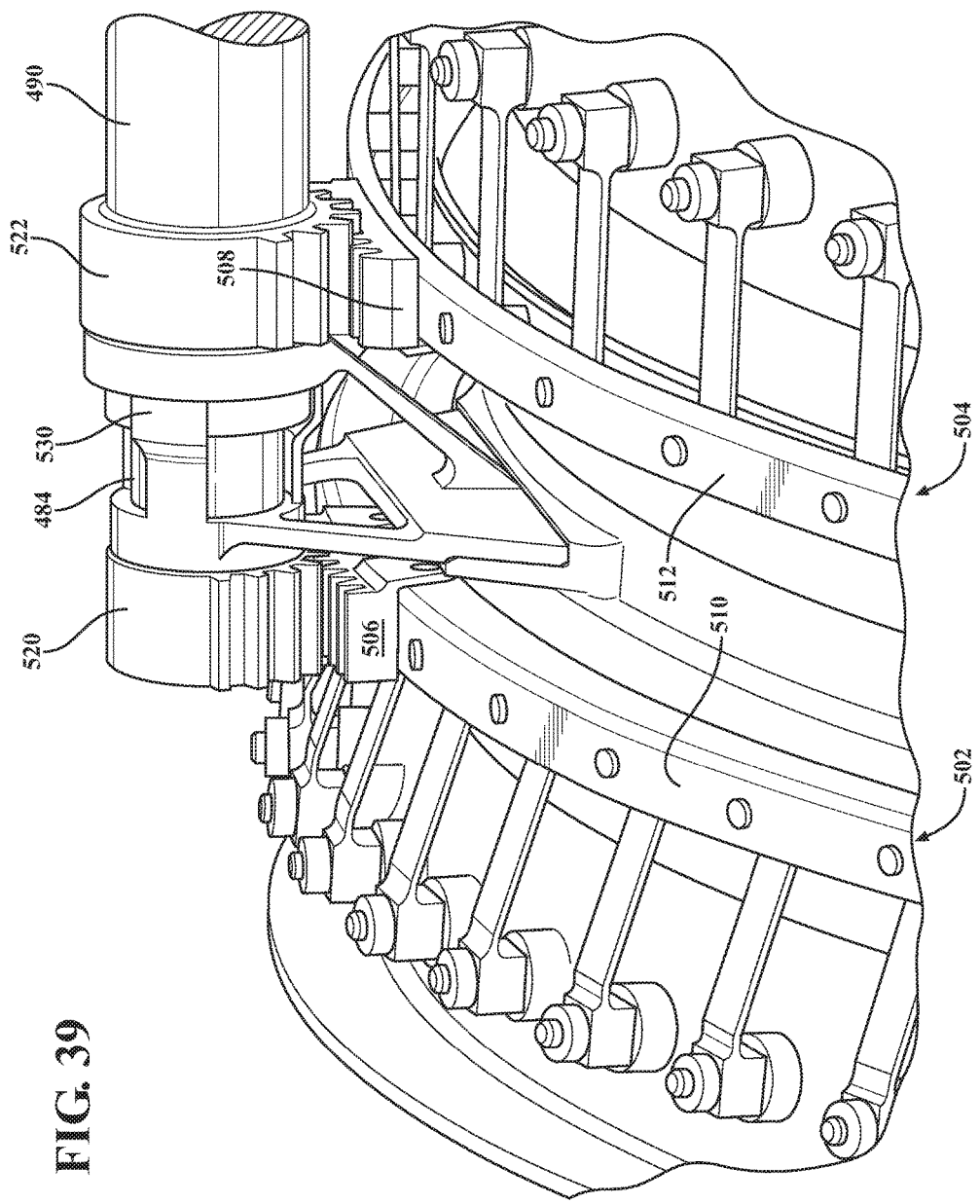
FIG. 39 is a perspective view of a variable vane system for a gas turbine engine according to one disclosed non-limiting embodiment.

With reference to FIG. 39, the first drive shaft 484 and the second drive shaft 490 are independently actuated to respectively control a variable vane stage 502, 504. The first drive shaft 484 and the second drive shaft 490 are operable to drive respective gears 506, 508 in a siding gear arrangement as described above to drive respective unison rings 510, 512 (FIGS. 17, 18). The respective distal end 520, 522 of the first drive shaft 484 and the second drive shaft 490 may be supported by a support bracket 530 mounted to the engine case.

The actuator system 118J permits variable vane stages to be actuated independently from a remote distance to provide thermal isolation behind a firewall, or because the motors must be relocated due to limited packaging space.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A variable vane system for a gas turbine engine, comprising: an actuator; a harmonic drive driven by the actuator; a drive gear driven by the harmonic drive; and a geared unison ring driven by the drive gear, the geared unison ring axially slidable parallel to an engine axis with respect to the drive gear, wherein a rotation of the unison ring results in an axial motion of the unison ring that is accommodated by the axial sliding between a gear mesh of the geared unison ring and the drive gear.

2. The system as recited in claim 1, wherein the geared unison ring includes a gear segment meshed with the drive gear.

3. The system as recited in claim 2, wherein the drive gear is wider than the gear segment.

4. The system as recited in claim 1, further comprising a support that rotationally supports the drive gear.

5. The system as recited in claim 1, wherein the harmonic drive includes a strain wave gearing mechanism.

6. The system as recited in claim 5, wherein the strain wave gearing mechanism include a fixed circular spline, a flex spline attached to an output shaft, and a wave generator attached to an input shaft, the flex spline driven by the wave generator with respect to the circular spline.

7. The system as recited in claim 1, wherein the harmonic drive provides between a 30:1-320:1 gear ratio.

8. The system as recited in claim 1, wherein the actuator is an electric motor.

9. A gas turbine engine, comprising: a variable vane system comprising a multiple of variable vanes; a geared unison ring connected to each of the multiple of variable vanes through a respective drive arm; and a harmonic drive operable to drive the variable vane system through a geared connection, the geared connection comprising the geared unison ring, the geared unison ring axially slidable parallel to an engine axis with respect to a drive gear, wherein a rotation of the unison ring results in an axial motion of the unison ring that is accommodated by the axial sliding between a gear mesh of the geared unison ring and the drive gear, the geared unison ring comprising a gear segment on an outer diameter of the geared unison ring, the gear segment meshed with the drive gear, the drive gear wider than the gear segment.

10. The gas turbine engine as recited in claim 9, further comprising: an actuator; wherein the harmonic drive is driven by the actuator, and the drive gear is driven by the harmonic drive.

11. The gas turbine engine as recited in claim 10, wherein the actuator is an electric motor.

12. The gas turbine engine as recited in claim 11, wherein the actuator is parallel to the engine axis.

\* \* \* \* \*